US012567981B2

(12) United States Patent
Pala

(10) Patent No.: US 12,567,981 B2
(45) Date of Patent: Mar. 3, 2026

(54) SYSTEMS AND METHODS FOR DATA AUTHENTICATION USING COMPOSITE KEYS AND SIGNATURES

(71) Applicant: CABLE TELEVISION LABORATORIES, INC., Louisville, CO (US)

(72) Inventor: Massimiliano Pala, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 849 days.

(21) Appl. No.: 17/570,813

(22) Filed: Jan. 7, 2022

(65) Prior Publication Data

US 2022/0353061 A1     Nov. 3, 2022

Related U.S. Application Data

(63) Continuation-in-part of application No. 16/537,380, filed on Aug. 9, 2019, now Pat. No. 11,552,806.
(Continued)

(51) Int. Cl.
*H04L 9/32* (2006.01)
*H04L 9/08* (2006.01)
*H04L 9/14* (2006.01)

(52) U.S. Cl.
CPC .......... *H04L 9/3268* (2013.01); *H04L 9/0825* (2013.01); *H04L 9/14* (2013.01); *H04L 9/3247* (2013.01)

(58) Field of Classification Search
None
See application file for complete search history.

(56) References Cited

U.S. PATENT DOCUMENTS 6,931,537 B1 * 8/2005 Takura .................. H04L 9/3297
                                                    713/180
8,001,381 B2 8/2011 Metke et al.
(Continued)

FOREIGN PATENT DOCUMENTS

CA        3154434 A1    4/2021
CN     104660602 A     5/2015
(Continued)

OTHER PUBLICATIONS

Fatima et al., X.509 and PGP Public Key Infrastructure Methods, a Critical Review, 2015, IFCSNS International Journal of Computer Science and Network Security, vol. 15, No. 5: pp. 55-59 (Year: 2015).*
(Continued)

*Primary Examiner* — Luu T Pham
*Assistant Examiner* — Edward X Long
(74) *Attorney, Agent, or Firm* — Armstrong Teasdale LLP

(57) ABSTRACT

A system for enhanced public key infrastructure is provided. The system includes a computer device. The computer device is programmed to receive a digital certificate including a composite signature field including a plurality of signatures. The plurality of signatures includes at least a first signature and a second signature. The computer device is also programmed to retrieve, from the digital certificate, a first key associated with the first signature from the digital certificate. The computer device is further programmed to retrieve the first signature from the composite signature field. In addition, the at least one computer device is programmed to validate the first signature using the first key.

20 Claims, 3 Drawing Sheets

Related U.S. Application Data

(60) Provisional application No. 63/152,978, filed on Feb. 24, 2021, provisional application No. 62/869,953, filed on Jul. 2, 2019, provisional application No. 62/713,165, filed on Aug. 1, 2018.

(56) References Cited

U.S. PATENT DOCUMENTS

| | | | |
|---|---|---|---|
| 8,855,316 | B2 | 10/2014 | Wiseman et al. |
| 9,912,486 | B1* | 3/2018 | Sharifi Mehr ........ H04L 9/3265 |
| 10,205,595 | B2 | 2/2019 | Frascadore |
| 10,250,590 | B2 | 4/2019 | Gryb et al. |
| 10,454,904 | B2 | 10/2019 | Huh et al. |
| 10,615,969 | B1 | 4/2020 | Griffin et al. |
| 11,115,217 | B2 | 9/2021 | Shekh-Yusef et al. |
| 11,171,964 | B1 | 11/2021 | Huang et al. |
| 11,218,301 | B1 | 1/2022 | Shea et al. |
| 11,405,789 | B1 | 8/2022 | Wei et al. |
| 11,456,867 | B2 | 9/2022 | Schmatz et al. |
| 11,552,806 | B2 | 1/2023 | Pala |
| 11,582,031 | B2 | 2/2023 | Wang et al. |
| 11,599,862 | B1 | 3/2023 | Hecht et al. |
| 11,616,645 | B1 | 3/2023 | Wang et al. |
| 12,028,324 | B1 | 7/2024 | Pala |
| 2002/0199001 | A1 | 12/2002 | Wenocur et al. |
| 2003/0172269 | A1 | 9/2003 | Newcombe |
| 2006/0056630 | A1 | 3/2006 | Zimmer et al. |
| 2006/0136714 | A1 | 6/2006 | Yagi et al. |
| 2006/0222180 | A1 | 10/2006 | Elliott |
| 2008/0031459 | A1 | 2/2008 | Voltz et al. |
| 2009/0016736 | A1 | 1/2009 | Beal et al. |
| 2009/0031141 | A1 | 1/2009 | Pearson et al. |
| 2009/0163176 | A1 | 6/2009 | Hasegawa |
| 2009/0316910 | A1 | 12/2009 | Maeda et al. |
| 2010/0049975 | A1 | 2/2010 | Parno et al. |
| 2010/0161817 | A1 | 6/2010 | Xiao et al. |
| 2011/0010547 | A1 | 1/2011 | Noda |
| 2011/0126011 | A1 | 5/2011 | Choi et al. |
| 2012/0177201 | A1 | 7/2012 | Ayling et al. |
| 2012/0272056 | A1 | 10/2012 | Ganesan |
| 2013/0083926 | A1 | 4/2013 | Hughes et al. |
| 2013/0251145 | A1 | 9/2013 | Lowans et al. |
| 2013/0310006 | A1 | 11/2013 | Chen et al. |
| 2013/0318343 | A1 | 11/2013 | Bjarnason et al. |
| 2014/0014715 | A1 | 1/2014 | Moran et al. |
| 2014/0289520 | A1 | 9/2014 | Tanizawa et al. |
| 2015/0288517 | A1 | 10/2015 | Evans et al. |
| 2015/0310221 | A1 | 10/2015 | Lietz et al. |
| 2016/0248586 | A1 | 8/2016 | Hughes et al. |
| 2017/0034133 | A1 | 2/2017 | Korondi et al. |
| 2017/0063827 | A1 | 3/2017 | Ricardo |
| 2017/0063834 | A1 | 3/2017 | Gryb et al. |
| 2017/0149568 | A1* | 5/2017 | LaGrone ............. G06F 12/1408 |
| 2017/0214525 | A1 | 7/2017 | Zhao et al. |
| 2017/0338951 | A1 | 11/2017 | Fu et al. |
| 2017/0338952 | A1 | 11/2017 | Hong et al. |
| 2018/0026982 | A1 | 1/2018 | Wei |
| 2018/0041497 | A1 | 2/2018 | Morishita et al. |
| 2018/0062842 | A1 | 3/2018 | Arahira |
| 2018/0097640 | A1* | 4/2018 | Queralt ............... H04L 63/0815 |
| 2018/0109378 | A1 | 4/2018 | Fu |
| 2018/0212779 | A1 | 7/2018 | Bergmann |
| 2018/0262243 | A1 | 9/2018 | Ashrafi et al. |
| 2018/0262504 | A1* | 9/2018 | Frederick ................ H04L 9/006 |
| 2019/0020641 | A1* | 1/2019 | Wasily ................... G06F 21/44 |
| 2019/0036688 | A1 | 1/2019 | Wasily et al. |
| 2019/0036914 | A1 | 1/2019 | Tzur-David et al. |
| 2019/0123901 | A1 | 4/2019 | Vijayanarayanan |
| 2019/0245690 | A1 | 8/2019 | Shah et al. |
| 2019/0319804 | A1 | 10/2019 | Mathew et al. |
| 2019/0373471 | A1 | 12/2019 | Li et al. |
| 2020/0280549 | A1 | 9/2020 | Kaliski, Jr. et al. |
| 2021/0044433 | A1 | 2/2021 | Hay et al. |
| 2021/0044976 | A1 | 2/2021 | Avetisov et al. |
| 2021/0099292 | A1 | 4/2021 | Gilton et al. |
| 2021/0119788 | A1 | 4/2021 | Wang |
| 2022/0006835 | A1 | 1/2022 | Gray et al. |
| 2022/0094675 | A1 | 3/2022 | Madisetti et al. |
| 2022/0231843 | A1 | 7/2022 | Garcia Morchon et al. |
| 2023/0014894 | A1 | 1/2023 | M et al. |
| 2023/0020193 | A1 | 1/2023 | Williams et al. |
| 2023/0206198 | A1 | 6/2023 | Hecht et al. |

FOREIGN PATENT DOCUMENTS

| | | | |
|---|---|---|---|
| CN | 107204812 | A | 9/2017 |
| CN | 107404461 | A | 11/2017 |
| CN | 114631049 | A | 4/2022 |
| EP | 1927209 | A1 | 6/2008 |
| EP | 2164189 | A1 | 3/2010 |
| EP | 3432509 | A1 | 1/2019 |
| JP | 2007288694 | A | 11/2007 |
| JP | 2012080229 | A | 4/2012 |
| WO | 2011134507 | A1 | 11/2011 |
| WO | 2016073552 | A1 | 5/2016 |

OTHER PUBLICATIONS

Canetti, R., Jun. 2004, Universally composable signature, certification, and authentication. In Proceedings. 17th IEEE Computer Security Foundations Workshop, 2004. (pp. 219-233). IEEE. (Year: 2004).*

Wang, X., Bai, Y. and Hu, L., Sep. 2015, Certification with multiple signatures. In Proceedings of the 4th Annual ACM Conference on Research in Information Technology (pp. 13-18). (Year: 2015).*

Harn, L., and Rn, J., 2011. Generalized digital certificate for user authentication and key establishment for secure communications. IEEE Transactions on Wireless Communications, 10(7), pp. 2372-2379. (Year: 2011).

Sun, Y., Zhang, R., Wang, X., Gao, K. and Liu L., Jul. 2018, A decentralizing attribute-based signature for healthcare blockchain. In 2018 27th International conference on computer communication and networks (ICCCN) (pp. 1-9). IEEE. (Year: 2018).

Burstinghaus-Steinbach, K., Kraus, C., Niederhagen, R., and Schneider, M., Oct. 2020, Post-quantum TLS on embedded systems: Integrating and evaluating kyber and sphincs+ with mbed tls. In Proceedings of the 15th ACM Asia Conference on Computer and Communications Security (pp. 841-852). (Year: 2020).

Paquin, C., Stebila, D. and Tamvada, G., 2020. Benchmarking post-quantum cryptography in TLS. In Post-Quantum Cryptography; 11th International Conference, PQCrypto 2020, Paris, France, Apr. 15-17, 2020, Proceedings 11 (pp. 72-91). Springer International Publishing. (Year: 2020).

[1] The Internet Engineering Task Force (IETF)—IETF RFC 5280. Internet X.509 Public Key Infrastructure Certificate and Certificate Revocation List (CRL) Profile, edited by W. Polk et al., May 2008. Also available at https://datatracker.ietf.org/doc/rfc5280/.

Aes 16: Markus Grassl, Brandon Langenberg, Martin Roetteler, and Rainer Stein-wandt. Applying Grover's Algorithm to AES: Quantum Resource Estimates. In PQCrypto, vol. 9606 of Lecture Notes in Computer Science, pp. 29-43. Springer, Year: 2016.

Aes20: Xavier Bonnetain, Maria Naya-Plasencia and Andre Schrottenloher. Quantum Security Analysis of AES. IACR Transactions on Symmetric Cryptology vol. 0, No. 0, pp. 1-3, Year: 2020.

Amaral Gustavo C., et al: "WDM-PON Monitoring with Tunable Photon Counting OTDR," IEEE Photonics Technology Letters, IEEE, USA, vol. 26, No. 13, Jul. 1, 2014 (Jul. 1, 2014), pp. 1279-1282, XOP011550969, ISSN: 1041-1135, DOI: 10.1109/LPT. 2014.2320871 [retrieved on Jun. 10, 2014] *abstract*.

Chen et al; Metropolitan all-pass and inter-city quantum communication network; Dec. 2010; Optical society of America; pp. 1-9. (Year: 2010).

Choi, P.S. et al: "Quantum key distribution on a 10Gb/s WDM-PON," Optical Fiber Communication (OFC), Collocated National Fiber Optic Engineers Conference, 2010 Conference on (OFC/NFOEC), IEEE, Piscataway, NJ, USA, Mar. 21, 2010 (Mar. 21, 2010), pp. 1-3, XP03167683.

(56)                    References Cited

OTHER PUBLICATIONS

Com20: M. Pala. Composite Public Keys and Signatures, IETF. Feb. 2019.
Doc31: Data-Over-Cable Service Interface Specifications, DOCSIS 3.1, Security Specifications. CableLabs Publication, 2020. Available as CM-SP-SECv3.1-IO9-200407; Year: 2020.
Doc40: Data-Over-Cable Service Interface Specifications, DOCSIS 4.0, Security Specifications. CableLabs Publication, 2019. Available as CM-SP-SECv4.0-IO1-190815; Year: 2019.
Dr99: Joan Daemen and Vincent Rijmen. AES proposal: Rijndael. Year: 1999.
Elboukhari, Mohamed et al. "Integration of Quantum Key Distribution in the TLS Protocol." IJCSNS International Journal of Computer Science and Network Security, vol. 9. No. 12, (2009). (Year: 2009).
Gro96: Lov K. Grover. A Fast Quantum Mechanical Algorithm for Database Search. In Gary L. Miller, editor, Proceedings of the Twenty-Eighth Annual ACM Symposium on the Theory of Computing, Philadelphia, Pennsylvania, USA, May 22-24, 1996, pp. 212-219. ACM, Year: 1996.
International Search Report is corresponding application PCTUS2056172 (Mar. 3, 2021).
ITU509: ITU-T Recommendation X.509 (2005) | ISO/IEC 9594-8:2005, Information Technology—Open Systems Interconnection—The Directory: Public-key and attribute certificate frameworks; Year: 2005.
Kumavor P. D., et al: "Comparison of Four Multi-User Quantum Key Distribution Schemes Over Passive Optical Networks," Journal of Lightwave Technology, IEEE, USA, vol. 23, No. 1, Jan. 1, 2005 (Jan. 1, 2025), pp. 168- j276, XP001227328, ISSN: 0733-8724, DOI: 10.1109/JLT.2004.834481 *abstract*.
Luo et al; Time Synchronization over Ethernet Passive Optical Networks; Oct. 2012; IEEE; pp. 1-7. (Year: 2012).
M. Bagnulo. "Stateful NAT64: Network Address Protocol Translation from IPV6 Clients o IPv4 Servers." Internet Engineering Task For (IETF). ISSN: 2070-1721. p. 10/39. Apr. 2011. (Year: 2011).
Ntru10: American National Standards Institute (2010) Ansi X9.98-2010—Lattice-Based Polynomial Public Key Establishment Algorithm for the Financial Services Industry (ANSI, New York City, United States). Available at https://webstore.ansi.org/standards/ascx9/ansix9982010r2017; Year: 2010.
Ntru9: Institute of Electrical and Electronics Engineers (2009) IEEE Standard1363.1-2008—Specification for Public Key Cryptographic Techniques Based on Hard Problems over Lattices (IEEE, Piscataway, New Jersey, United States). Available at https://doi.org/10.1109/IEEESTD.2009.4800404; Year: 2009.
PKCS11: Oasis Standard, S. Gleeson and C. Zimman, PKCS #11 Cryptographic Token Interface Base Specification, Version 2.40, Apr. 2015.
RFC 2986: IETF 2986, M. Nystrom, et al., PKCS #10: Certification Request Syntax Specification, Version 1.7, Nov. 2000.
RFC 3279: IETF RFC 3279, W. Polk, et al., Algorithms and Identifiers for the Internet X.509 Public Key Infrastructure Certificate and Certificate Revocation List (CRL) Profile, Apr. 2002.
RFC 5272: IETF RFC 5272, J. Schaad, et al., Certificate Management over CMS (CMC), Jun. 2008.
RFC 5273: IETF RFC 5273, J. Schaad, et al., Certificate Management over CMS (CMC): Transport Protocols, Jun. 2008.
RFC 5280: IETF RFC 5280, W. Polk, et al., Cryptographic Message Syntax (CMS), May 2008.
RFC 5652: IETF RFC 5652, R. Housley, Cryptographic Message Syntax (CMS), Sep. 2009.
RFC 5758: IETF RFC 5758, Q. Dang, et al., Internet X.509 Public Key Infrastructure: Additional Algorithms and Identifiers for DSA and ECDSA, Jan. 2010.
RFC 5869: IETF RFC 5869, H. Krawczyk and P. Eronen, HMAC-based Extract-and-Expand Key Derivation Function (HKDF), May 2010.
RFC 6402: IETF RFC 6402, J. Schaad, Certificate Management over CMS (CMC) Updates, Nov. 2011.
RFC 6818: IETF RFC 6818, P. Yee, Updates to the Internet X.509 Public Key Infrastructure Certificate and Certificate Revocation List (CRL) Profile, Jan. 2013.
RFC 8446: IETF RFC 8446, E. Rescorla, et al., The Transport Layer Security (TLS) Protocol, Version 1.3, Aug. 2018.
RFC 8555: IETF RFC 8555, R. Barnes, et al., Automatic Certificate Management Environment (ACME), Mar. 2019.
RFC 8696: IETF RFC 8696, R. Housley, Using Pre-Shared Key (PSK) in the Cryptographic Message Syntax (CMS), Dec. 2019.
Rphy18: Data-Over-Cable Service Interface Specifications, DCA—MHAv2. Remote PHY Specification. Available as CM-SP-R-PHY-110-180509; Year.
The Internet Engineering Task Force (IETF)—IETF RFC 2986. PKCS#10: Certification Request Syntax Specification Version 1.7, edited by M. Nystrom et al., Nov. 2000. Also available at https://datatracker.ietf.org/doc/rfc2986/.

* cited by examiner

SYSTEMS AND METHODS FOR DATA AUTHENTICATION USING COMPOSITE KEYS AND SIGNATURES

CROSS REFERENCE TO RELATED APPLICATIONS

This application is a continuation-in-part of U.S. patent application Ser. No. 16/537,380, filed Jul. 9, 2019, entitled "SYSTEMS AND METHODS FOR DATA AUTHENTI-CATION USING COMPOSITE KEYS AND SIGNA-TURES," which claims the benefit of and priority to U.S. Provisional Patent Application No. 62/869,953, filed Jul. 2, 2019, entitled "COMPOSITE KEYS AND SIGNATURES FOR DATA AUTHENTICATION," and also to U.S. Provisional Patent Application No. 62/713,165, filed Aug. 1, 2018, entitled "COMPOSITE KEYS AND SIGNATURES FOR DATA AUTHENTICATION." This application also claims the benefit of and priority to U.S. Provisional Patent Application No. 63/152,978, filed Feb. 24, 2021, entitled "COMPOSITE AND COMBINED KEYS AND SIGNA-TURES FOR DATA AUTHENTICATION AND TAR-GETED ALGORITHM DEPRECATION WITH MASS REVOCATION OPTIONS." The entire contents and dis-closures of all of these prior applications are incorporated by reference herein in their entireties.

BACKGROUND

The field of the disclosure relates generally to an enhanced public key infrastructure (PKI), and more particu-larly, to systems and methods for providing PKI supporting multiple keys with multiple encryption techniques.

Many conventional electronic devices utilize digital cer-tificates, such as X.509 certificates to establish trust between devices. The digital certificates are tied to the identity of a person or legal entity, typically through a trusted Certificate Authority (CA). Overtime the digital certificates may need to be revoked for a variety of reasons, including the encryp-tion keys associated with the certificate have been compro-mised.

One of the major security features of the digital certifi-cates is the security of the public and private key associated with the certificate. Since the security of PKIs depends on the security of the cryptographic building blocks that are used for authentication and encryption, the standard com-munication has made algorithm agility one of the main goals to provide the possibility to use different algorithm and potentially upgrade to newly available algorithms when needed.

However, present key systems do not account for the definition of new algorithms (e.g. more efficient factoring techniques) and technologies (e.g., quantum-based comput-ing devices) that may be available in the near future. Accordingly, there is a need for easy-to-deploy and efficient solutions to provide support for multi-algorithm authentica-tion.

SUMMARY

In an embodiment, a system for enhanced public key infrastructure is provided. The system includes a computer device including at least one processor in communication with at least one memory device. The at least one memory device stores a plurality of instructions. The at least one processor is programmed to receive a digital certificate including a composite signature field including a plurality of signatures. The plurality of signatures includes at least a first signature and a second signature. The at least one processor is also programmed to retrieve, from the digital certificate, a first key associated with the first signature from the digital certificate. The at least one processor is further programmed to retrieve the first signature from the composite signature field. In addition, the at least one processor is programmed to validate the first signature using the first key.

In another embodiment, a computing device for enhanced public key infrastructure is provided. The computing device includes at least one processor in communication with at least one memory device. The at least one memory device stores a plurality of instructions. The at least one processor is programmed to generate a first signature using a first key and a first cryptographic algorithm. The at least one proces-sor is also programmed to generate a second signature using a second key and a second cryptographic algorithm. The at least one processor is further programmed to combine the first signature and the second signature into a composite signature. In addition, the at least one processor is pro-grammed to generate a digital certificate including the composite signature in a single field.

In a further embodiment, a system for enhanced public key infrastructure is provided. The system includes a com-puter device including at least one processor in communi-cation with at least one memory device. The at least one memory device stores a plurality of instructions. The at least one processor is programmed to receive a digital certificate including a combined signature field including a plurality of signatures. The plurality of signatures includes at least a first signature and a second signature. The at least one processor is also programmed to retrieve, from the digital certificate, a first key associated with the first signature from the digital certificate. The at least one processor is further programmed to retrieve the first signature from the composite signature field. In addition, the at least one processor is programmed to validate the first signature using the first key. Moreover, the at least one processor is programmed to decrypt the first signature to retrieve the second signature. Furthermore, the at least one processor is programmed to retrieve, from the digital certificate, a second key associated with the second signature. In addition, the at least one processor is also programmed to validate the second signature using the second key. In other embodiments, the system may have more or less features.

In an additional embodiment, a computing device for enhanced public key infrastructure is provided. The com-puting device includes at least one processor in communi-cation with at least one memory device. The at least one memory device stores a plurality of instructions. The at least one processor is programmed to generate a first signature using a first key and a first cryptographic algorithm. The at least one processor also is programmed to generate a second signature using a second key, a second cryptographic algo-rithm, and the first signature. The at least one processor is further programmed to add the second signature to a com-posite signature. In addition, the at least one processor is programmed to generate a digital certificate including the composite signature in a single field.

In yet a further embodiment, a system for enhanced public key infrastructure is provided. The system includes a com-puter device including at least one processor in communi-cation with at least one memory device. The at least one memory device stores a plurality of instructions. The at least one processor is programmed to receive a digital certificate including a composite signature field including a plurality of signatures and a threshold. The plurality of signatures includes at least a first signature and a second signature. The threshold represents a number of valid signatures required. The at least one processor is also programmed to retrieve, from the digital certificate, a first key associated with the first signature from the digital certificate. The at least one processor is further programmed to retrieve the first signature from the composite signature field. In addition, the at least one processor is programmed to validate the first signature using the first key. Moreover, the at least one processor is programmed to retrieve, from the digital certificate, a second key associated with the second signature. Furthermore, the at least one processor is programmed to retrieve the second signature from the composite signature field. In addition, the at least one processor is also programmed to validate the second signature using the second key. In addition, the at least one processor is further programmed to compare a number of validated signatures. Moreover, the at least one processor is also programmed to validate the digital certificate if the number of validated signatures meets the threshold based on the comparison.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
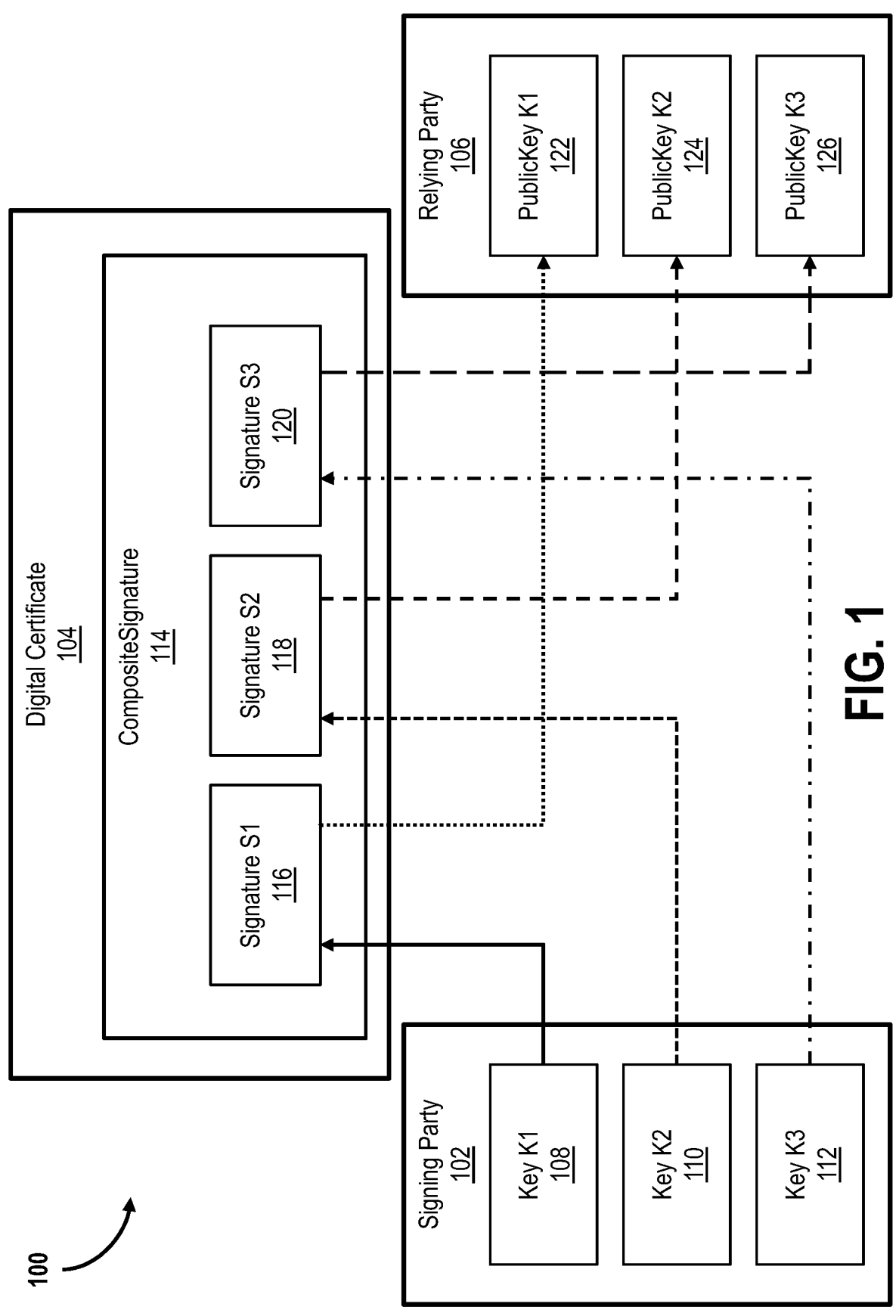
FIG. 1 is a schematic illustration of a composite signature process and the data structures used with the composite signature process, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This disclosure defines two building blocks that can be applied to many environments where Public Key authentication is used—i.e., from the generation of certificates that are authenticated with multiple signatures (i.e., using multiple keys that may or may not use different cryptographic schemes or different number of security bits), to the possibility of specifying composite public keys (instead of one) in a certificate (or authentication tokens), or even to secure revocation and timestamping information by using multiple signatures that use different hashing and signing algorithms.

The two building blocks that make the core of this disclosure are (a) composite keys composite signatures and (b) combined keys and signatures. The embodiments described herein provide systems and methods for enhanced public key infrastructure (PKI) by providing support for multiple keys with multiple encryption methods. More specifically, the systems and methods described herein provide for composite keys and signatures, as well as combined keys and signatures, that allow digital certificates to support more than one public key.

In an exemplary embodiment, the present systems and methods utilize an X.509 trust model, in which a trusted third party CA is responsible for signing digital certificates. Accordingly, as described herein, the CA is presumed to have capability to store one or more trusted root certificates (or intermediate certificates) as well as the corresponding private keys. The CA is further responsible for maintaining up-to-date revocation information regarding the validity of issued certificates, and will provide information to the other parties, for example, through an Online Certificate Status Protocol (OCSP). In some embodiments, the CA may provide information according to a Certificate Revocation List (CRL). The OCSP is an Internet protocol for obtaining a revocation status of an X.509 digital certificate, and is generally considered an alternative to the CRL. OCSP messages may be communicated, for example, by Abstract Syntax Notation One (ASN.1) encoding over the Hypertext Transfer Protocol (HTTP), from and to OCSP responders of the CA server (or OCSP server).

In an X.509 Certificate the specification allows for a single public key as described here:

```
AlgorithmIdentifier ::= SEQUENCE {
        algorithm          OBJECT IDENTIFIER
        parameters         ANY DEFINED BY
                           algorithm OPTIONAL}
SubjectPublicKeyInfo ::= SEQUENCE {
        algorithm          AlgorithmIdentifier
        subjectPublicKey   BIT STRING }
```

In particular, the ("SubjectPublicKeyInfo") comprises an ("algorithmIdentifier") that identifies the cryptographic algorithm and associated parameters, and a ("subjectPublicKey") which is a BIT STRING, such as shown in RFC (Request for Comment) 5280. The value of the "subjectPublicKey") is the DER (distinguished encoding rules) encoding of the public key structure as defined for the specific algorithm used. For example, section 2.3.1 of RFC 3279 defines the contents of the ("subjectPublicKeyInfo") and how to encode the ("RSAPublicKey") structure whose DER representation is to be used for the value of the ("subjectPublicKey") BIT STRING. In some embodiments, the digital certificate may include an extension that allows it to encode an additional public key and additional signatures.

In the exemplary embodiment, multiple public keys and signatures are encoded into the digital certificate using composite keys and composite signatures. This requires defining new algorithm identifiers and the associated encoding that utilizes standard sub-structures to simplify supporting sets of keys and their respective signatures. Accordingly, this may support the deployment of hybrid PKIs where the authentication may be performed by using 'traditional' or 'quantum resistant' cryptography. Furthermore, the systems and methods described herein could also be used to provide mixed authentication mechanisms that allow relying parties to rely on more than one algorithm for both signing and hashing to authenticate data (e.g., Certificates, CRLs, Generic Signed Data, etc.). For example, authentication could be performed by using the same cryptographic scheme with different hashing algorithms (e.g., one signature could be RSAwithSHA256 and another signature could be RSAwithSHA512). In another example, authentication could be performed with different cryptographic schemes with the same hashing algorithm (e.g., one signature could be with RSAwithSHA256 and another could be ECDSAwithSHA256). These examples could also be combined.

The relying party may decide to verify one, some, or all of the signatures in order to trust the authentication of the data. The relying party may decide based on the ability of the relying party to support the algorithms used for keys and signatures.

While the systems, methods, and examples described herein focus on X.509 keys and signatures, the systems and methods described herein may be used with other trust models to provide for encoding multiple keys and multiple signatures. In particular, the systems and methods described herein may be used with any public key solution that makes use of public key technology and provides a method to distinguish among algorithms for keys and signatures. The process described herein may be applied to non-X.509 infrastructures.

Composite Crypto Data Structures

In the exemplary embodiment, a new value is added to the 'algorithm' field within the 'AlgorithmIdentifier' used in the 'SubjectPublicKeyInfo' of a digital certificate, such as an X.509 Certificate. The new value is a specific object identifier or (OID) to specify the user of a 'composite key' scheme where multiple public keys are used in a certificate. The 'parameters' field of the 'AlgorithmIdentifier' is set to NULL in this case. One example definition of an OID that may be used with a multiple-key schema ('compositeKeys') is as follows:

```
compositeKeys OBJECT IDENTIFIER ::=
{iso(1) identified-organization (3)
    dod (6) internal (1) private (4)
    enterprise (1) OpenCA (188227)
    algorithms (10) compositeKeys (1) }
```

When the 'compositeKeys' value is used for the 'AlgorithmIdentifier,' the value encoded in the associated public key field (e.g., 'subjectPublicKey') contains multiple public keys and their associated parameters. Specifically, the public key value is encoded as the DER representation of a 'CompositePublicKeyInfo.' The "CompositePublicKeyInfo' is defined as a sequence of 'subjectPublicKeyInfo' where each 'subjectPublicKeyInfo' carries the information about one public key that is encoded in the certificate. The definition of 'CompositePublicKeyInfo' is as follows:

```
CompositeSubjectPublicKeyInfo::=SEQUENCE
    (1 . . . MAX) OF SubjectPublicKeyInfo (1 . . .
    MAX)
``` where the 'SubjectPublicKeyInfo' inside the 'CompositeSubjectPublicKeyInfo' may not use the 'compositeKey' as the algorithm identifier.

For example, having two different public keys in an X.509 certificate would be encoded as follows:

```
aCompositeSubjectPublicKeyInfo = { keyInfoOne, keyInfoTwo };
-- This is the main structure with a sequence of two subjectPublicKeyInfo.
keyInfoOne.algorithm.algorithm           = rsaEncryption;
```

-continued

```
keyInfoOne.algorithm.parameters        = NULL;
keyInfoOne.subjectPublickKey           = RSAPublicKey;
-- keyInfoOne provides the information/definition of the first key (RSA)
keyInfoTwo.algorithm.algorithm         = id-ecPublicKey;
keyInfoTwo.algorithm.parameters        = EcpkParameters;
keyInfoTwo.subjectPublickKey           = ECPoint;
-- keyInfoTwo provides the information/definition of the second key (ECDSA)
aCertificate.tbsCertificate.subjectPublicKeyInfo.algorithm.algorithm      =
        compositeKey;
aCertificate.tbsCertificate.subjectPublicKeyInfo.algorithm.parameters     =
        NULL;
aCertificate.tbsCertificate.subjectPublicKeyInfo.algorithm.subjectPublicKey  =
        DER (aCompositeSubjectPublicKeyInfo);
``` where 'aCompositeSubjectPublicKeyInfo' is the sequence of two 'subjectPublicKeyInfo' (i.e., keyInfoOne and keyInfoTwo). The DER representation of the sequence is then stored in the subjectPublicKey field of subjectPublicKeyInfo in the certificate structure.

In the exemplary embodiment, a new value is added to the 'algorithm' field within the 'AlgorithmIdentifier' used in a digital certificate, such as an X.509 Certificate. The new value identifies a 'composite signature' schema where multiple signatures are used to authenticate the contents of a certificate. The 'parameters' field of the "AlgorithmIdentifier' is set to NULL in this case. One example definition of an OID that may be sued with a multiple-key schema ('compositeSignatures') is as follows:

```
compositeSignatures OBJECT IDENTIFIER ::=
  {iso(1) identified-organization
       (3) dod (6) internet (1) private (4)
       enterprise (1) OpenCA (188227)
       algorithms (11) compositeSignatures (2) }
```

When the 'compositeSignatures' value is used for the algorithm identifier in the 'signatureAlgorithm' field of the certificate, the value encoded in the corresponding 'signatureValue' field contains multiple signatures and their associated parameters. Specifically, the 'signatureValue' field is the DER representation of a 'CompositeSignatureValue' that is a sequence of 'SignatureInfo' where each 'SignatureInfo' carries the information about one of the signatures applied to the certificate. The definition of 'CompositeSignatureInfo' is as follows:

```
CompositeSignatureValue::=SEQUENCE (1 . . .
    MAX) OF SignatureInfo
```

For example, in order to encode signatures made with two different keys (aka one RSA key and one EC key) the certificate would be encoded as follows:

```
aCompositeSignatureInfo = { sigInfoOne, sigInfoTwo };
-- This is the main structure with a sequence of two SignatureInfo.
sigInfoOne.algorithm.algorithm    = rsaEncryption;
sigInfoOne.algorithm.parameters   = NULL;
sigInfoOne.subjectPublickKey      = <RSA Signature Value>;
-- sigInfoOne provides the definition of the first signature (RSA)
sigInfoTwo.algorithm.algorithm    = id-ecPublicKey;
sigInfoTwo.algorithm.parameters   = EcpkParameters;
sigInfoTwo.subjectPublickKey      = <ECDSA Signature Value>;
-- sigInfoTwo provides the definition of the second signature (ECDSA)
aCertificate.signatureAlgorithm.algorithm.algorithm = compositeKey;
aCertificate.signatureAlgorithm.algorithm.parameters        = NULL;
aCertificate.signatureValue = DER (aCompositeSignatureInfo);
``` where 'aCompositeSignatureInfo' is the sequence of two 'SignatureInfo' (i.e., sigInfoOne and sigInfoTwo). The aCompositeSignatureInfo is then encoded by using DER and the output value is used for the 'signatureValue' field of the certificate structure.

In the exemplary embodiment, to generate the composite signatures, the signer generates each signature independently by using the set of keys in order. If the public keys that are used to verify the signatures are encoded in a 'CompositeSubjectKeyInfo' structure, the signer uses the first key to generate the first signature, the second key is used to generate the second signature, the third key is used to generate the third signature, etc. The signer generates one signature for each key in the key set. For example, 'CompositeSubjectKeyInfo' contains three keys K1, K2, and K3, which are of types RSA, RSA, and EC respectively. The signing party generates the first signature using key K1, the second signature using key K2, and the third signature using key K3.

In order to be able to verify Composite Signatures, a relying party shall verify each of the applied signatures independently. Moreover, the relying party might decide not to evaluate the correctness of signatures if they do not support the specific algorithms or, otherwise, refuse to trust the signed data entirely if they are not able to verify one or more elements of the composite signatures.

When the signer of a composite signature has an associated certificate, the relying party shall verify the signature by using the corresponding public key in the Composite Keys in order—i.e. the order of the single signatures within the Composite Signature shall respect the order of the keys in the Composite Key in the certificate.

For example, if the certificate has a 'CompositeSubjectPublicKeyInfo' that contains three keys $K_1$, $K_2$, and $K_3$ of types RSA, RSA, and EC respectively, the relying party shall verify the first signature in the Composite Signature by using $K_1$, the second signature in the Composite Signature by using $K_2$, and the last signature by using $K_3$. As long as one key passes the validation process, the relying party considers the signature as valid.

In the exemplary embodiment, to verify the composite signatures, the relying party verifies each of the applied signatures independently. In some embodiments, the relying party might decide to not evaluate all of the signatures. This may be the case where the relying party does not support the associated algorithm, or otherwise refuse to trust the signed data entirely if the relying party is not able to verify one or more elements in the composite signatures.

Combined Crypto Data Structures

In the exemplary embodiment, a new value is added to the 'algorithm' field within the 'AlgorithmIdentifier' used in the 'SubjectPublicKeyInfo' of a digital certificate, such as an X.509 Certificate. The new value is a specific object identifier or (OID) to specify the user of a 'combined key' scheme where multiple public keys are used in a certificate. The 'parameters' field of the 'AlgorithmIdentifier' is set to NULL in this case. One example definition of an OID that may be used with a multiple-key schema ('combinedKeys') is as follows:

```
combinedKeys OBJECT IDENTIFIER ::=
{iso(1) identified-organization (3)
     dod (6) internet (1) private (4)
     enterprise (1) OpenCA (188227)
     algorithms (10) combinedKeys (3) }
```

When the 'combineKeys' value is used for the 'AlgorithmIdentifier,' the value encoded in the associated public key field (e.g., 'subjectPublicKey') contains multiple public keys and their associated parameters. Specifically, the public key value is encoded as the DER representation of a 'CombinedPublicKeyInfo.' The "CombinedPublicKeyInfo' is defined as a sequence of 'subjectPublicKeyInfo' where each 'subjectPublicKeyInfo' carries the information about one public key that is encoded in the certificate. The definition of 'CombinedPublicKeyInfo' is as follows:

```
CombinedSubjectPublicKeyInfo::=SEQUENCE
     (1 . . . MAX) OF SubjectPublicKeyInfo (1 . . .
     MAX)
``` where the 'SubjectPublicKeyInfo' inside the 'CombinedSubjectPublicKeyInfo' may not use the 'combineKeys' as the algorithm identifier.

In the exemplary embodiment, a new value is added to the 'algorithm' field within the 'AlgorithmIdentifier' used in a digital certificate, such as an X.509 Certificate. The new value identifies a 'combined signature' schema where multiple signatures are used to authenticate the contents of a certificate. The 'parameters' field of the "AlgorithmIdentifier' is set to NULL in this case. One example definition of an OID that may be sued with a multiple-key schema ('combinedSignatures') is as follows:

```
combinedSignatures OBJECT IDENTIFIER ::=
{iso(1) identified-organization
     (3) dod (6) internet (1) private (4)
     enterprise (1) OpenCA (188227)
     algorithms (11) combinedSignatures (4) }
```

When the 'combinedSignatures' value is used for the algorithm identifier in the 'signatureAlgorithm' field of the certificate, the value encoded in the corresponding 'signatureValue' field contains multiple signatures and their associated parameters. Specifically, the 'signatureValue' field is the DER representation of a 'CombinedSignatureValue' that is a sequence of 'SignatureInfo' where each 'SignatureInfo' carries the information about one of the signatures applied to the certificate. The definition of 'CombinedSignatureInfo' is as follows:

```
CombinedSignatureValue::=SEQUENCE (1 . . .
     MAX) OF SignatureInfo
```

In the exemplary embodiment, to generate the combined signatures, the signer generates each signature independently by using the set of keys in order. If the public keys that are used to verify the signatures are encoded in a 'CombinedSubjectKeyInfo' structure, the signer uses the first key to generate the first signature, the second key is used to generate the second signature, the third key is used to generate the second signature, the third key is used generate the third signature, etc. The signer generates one signature for each key in the key set. In Combined Signatures, each signature includes the previous signature in its calculation, thus resulting in a nested signature structure where the first signature output from the previous signatures (i.e., the set of SignatureInfo generated with the previous keys in the Composite Key set. For example, 'CombinedSubjectKeyInfo' contains three keys K1, K2, and K3, which are of types RSA, RSA, and EC respectively. The signing party generates the first signature using key K1, the second signature using key K2, and the third signature using key K3, in the following way:

$$SignatureInfo_{K1}=Sig_{K1}(DATA);$$

$$SignatureInfo_{K2}=Sig_{K2}(DATA|SignatureInfo_{K1});$$

$$SignatureInfo_{K3}=Sig_{K3}$$
$$(DATA|SignatureInfo_{K1}|SignatureInfo_{K2});$$

Therefore, the Final value for the ("Combined Signature"), which is defined as the SEQUENCE of SignatureInfo data structure, will require to use the public keys to validate the signature.

In the exemplary embodiment, to verify the composite signatures and combined signatures, can be generated in similar manners.

In order to be able to verify a combined signature, a relying party verifies each of the applied signatures and return a positive result only if all of the signatures are validated correctly. Relying parties must be able to understand all the algorithms used in each of the components of the combined signature—a failure to validate any of the composing signature results in a rejection of the over-all signature.

When the signer of a combined signature has an associated certificate, the relying party shall verify the signature by using the corresponding combined key public key in the same order they appear in the certificate—I the order of the single signatures within the combined signature shall respect the order of the keys in the composite key in the certificate.

For example, if the certificate has a 'CombinedSubjectPublicKeyInfo' that contains three keys $K_1$, $K_2$, and $K_3$ of types RSA, RSA, and EC respectively, the relying party shall verify the first signature in the combined signature by using $K_1$ over the signed data, the second signature in the combined signature by using $K_2$ over the signed data plus the first SignatureInfo value, and the last signature by using $K_3$ over the signed data plus the first SignatureInfo value together with the second SignatureInfo value. Shall any error occur in the validation process, the relying party rejects the signature as invalid.

In some embodiments, the composite crypto structures may be used for trust structures to allow for backward compatibility or to allow for future upgrades to cryptographic capabilities. In these embodiments, the composite keys and composite signatures could include both weak and strong algorithms. Relying parties without updated cryptographic suites, such as devices that are already in the field, could then use the same infrastructure as those relying parties that are capable of using stronger algorithms to verify the signatures. These composite crypto structures would allow the support of older or already-in-the-field devices that have hardware constraints, such as a P-256 element that can only do P-256 encryption, without compromising the overall security of the infrastructure by also including stronger keys and algorithms that will be used by more cryptographically capable devices. Furthermore, these structures would support those devices that are able to upgrade, where the devices use the weaker algorithms to start with and then use the stronger algorithms when their cryptographic capabilities are upgraded (e.g., P-521 or Quantum-Resistant algorithms).

In some embodiments, the combined crypto structures may be used to deploy trust structures where combined signatures and combined keys can be used to force the validation of several algorithms at once. This case is aimed at combining the strength of different public key and signing algorithms. By using combined signatures, an implementer can force the validation of both 'classic' and 'post-quantum' algorithms by using a combined key inside certificates or any other type of credentials.

The use of composite crypto and combined crypto allows for the deployment of validation policies that are easily implementable in cryptographic libraries. Specifically, when a logical "OR" of the Keys/Signatures is required (e.g., in a backward compatible situation or in an "equivalent alternative" situation) the use of composite crypto is appropriate. When a logical "AND" of the Keys/Signature is required (e.g., you want to enforce trust to rely on all included keys/algorithms), the use of combined crypto is appropriate.

The use of separate identifiers to provide different validation procedures is a key aspect of the disclosure and allows for easier implementations of validation policies in crypto libraries. The validation mechanisms of the two different datatypes is explicit and implement different policies. Using the different datatypes allows for generating the trust infrastructures with the correct deployment of the validation policy for compliant entities.

In addition, there are mechanisms to identify basic keys that compose the compositePublicKey or combinedPublicKey in a certificate. The definition of an extended subjectKeyIdentifier where the identifiers for the basic Subject-PublicKeyInfo structures that compose the CompositePublicKey or CombinedPublicKey (each of which relate to one of the basic keys) are listed. This allows for the easy identification of the compromised basic keys across certificates. This definition may be expressed as:

```
ExtendedSubjectKeyIdentifier::=SEQUENCE OF
    (1 . . . MAX) KeyIdentifier---The KeyIdentifier
    is an OCTET STRING
``` where the value of each KeyIdentifier is the KeyIdentifier for a basic key in the compositePublicKey or combinedPublicKey.

Threshold Based Digital Certificates

The foregoing concepts, i.e., composite and combined crypto, enable "OR" and "AND" operations across keys, and which may be reformulated in terms of number of successful key operations that are needed for considering the overall operation successful. The data structures described above may be further expanded to define a set of generic X-Threshold container data structures where "X" indicates the number of successful key operations required for the overall container's operation to be considered successful. As used herein, the value "X" refers to the order of the container. For example, a 1-Threshold container has an order "1" while a 5-Threshold container has an order 5.

When the 'X-Threshold' value is used (where "X" can be 1 . . . N), for the algorithm identifier (e.g., 1-Threshold or 2-Threshold or . . . or N-Threshold), that means that the value encoded in the associated public key field (e.g., the 'subjectPublicKey' in X.509 Certificates as defined in RFC 5280 contains multiple public keys and associated parameters. On top of that, when using the keys within the container, the crypto library must verify that the number of successful operations at least matches the container's order (i.e., the "X"). For example, when validating a signature generated from a 2-Threshold container with 5 keys, the crypto library can successfully report the overall signature to be valid as soon as two (out of the 5) signatures are valid.

In more details, the public key value is encoded as the DER representation of a 'XThresholdPublicKeyInfo'. The 'XThresholdPublicKeyInfo' is defined as a sequence of 'subjectPublicKeyInfo' where each 'subjectPublicKeyInfo' carries the information about one public key that is encoded in the certificate. The definition of the 'XThresholdPublicKeyInfo' is as follows:

```
X-ThresholdSubjectPublicKeyInfo::=SEQUENCE
    (1 . . . MAX) OF SubjectPublicKeyInfo (1 . . .
    MAX)
```

Examples of specific types of threshold containers:

```
1ThresholdSubjectPublicKeyInfo::=SEQUENCE
    (1 . . . MAX) OF SubjectPublicKeyInfo (1 . . .
    MAX)

2ThresholdSubjectPublicKeyInfo::=SEQUENCE
    (1 . . . MAX) OF SubjectPublicKeyInfo (1 . . .
    MAX)

3ThresholdSubjectPublicKeyInfo::=SEQUENCE
    (1 . . . MAX) OF SubjectPublicKeyInfo (1 . . .
    MAX)

NThresholdSubjectPublicKeyInfo::=SEQUENCE
    (1 . . . MAX) OF SubjectPublicKeyInfo (1 . . .
    MAX)
``` where the 'NThresholdSubjectPublicKeyInfo' is used to define a container where all N keys must be used in the crypto operation (i.e., implements the same functionality as the "AND" or "Combined" container).

Symmetric Keys

Historically, only Public-Key Cryptography has been used in X.509 certificates. However, there is the need to combine both Public-Key Cryptography with Symmetric Cryptography to provide higher level of confidence that the authentication trace is vulnerable to solving some underlying hidden problem like in the case of RSA or EDCSA.

Composite Crypto provides the possibility of defining two different ways to combine different types of algorithms. Above the use of Public-Keys in ("Composite Keys") and ("Combined Keys") was described. The concept of Public-Key can also be extended to include a public-key for Symmetric Keys. The ("SymmetricPublicKey") structure is defined as follows:

```
SymmetricPublicKey        ::=        SEQUENCE        {
        hashAlgorithm                        AlgorithmIdentifier,
        ---  Identifier of the Hash Algorithm Used to calculate
        ---  the  public  key  of  the  symmetric  key
        hashSalt                                OCTET    STRING,
        ---  Salt used to calculate the public key of the symmetric key
        pubKeyValue                             OCTET    STRING
        ---  Value  of  the  Salted  Hash  that  can  be  used  to
        --- validate symmetric signatures (e.g., HMACs) }
``` where the ("hashAlgorithm") identifies the algorithm used to calculate the value of pubKeyValue. The value is calculated by using the identified hash algorithm on both the ("hashSalt") value and the ("pubKeyValue").

Furthermore, an Object Identifier is defined to be used to identify ("Symmetric Public Key") data structures in the ("subjectPublicKeyInfo") data structure (or similar) in Certificates (and other data structures) as follows:

```
symmetricPublicKey-id   OBJECT IDENTIFIER
::=  {iso(1)    identified-
        organization(3)
                dod(6) internet(1) private (4)
                enterprise(1) OpenCA(18227) 12
        }
```

Revocation Systems

The trust model that is usually assumed in PKIs relies on the Certification Authority to keep all participants in behaving according to the common policy: this is the entity that is supposed to protect the integrity of the ecosystem and provide the source of trust for all PKI operations. It is therefore the entity that should provide indications about which type of keys should not be trusted anymore.

With the introduction of multiple keys associated with a single certificate, there might be the need to revoke a specific key configuration across the whole set of issued certificates (i.e., a specific algorithm or a specific algorithm hierarchy). For example, there might be the need to revoke the trust in a single algorithm (i.e., RSA) an algorithm within a Composite Key (i.e., an EC key), or an algorithm combination that is used in a Combined Key (i.e., RSA+ECDSA). This allows the ecosystem administrators to revoke, for example, the use of RSA in certificates (as a primary key type) or in Composite Keys, but still allow the use of the RSA algorithm when used in safe combinations within Combined Keys (e.g., RSA+Symmetric AES-256 key).

An example of the complexity that raises with the introduction of Composite Crypto mechanisms can be easily explained by the following example. While trying to validate a certificate chain, the relying party might decide, in order to trust the authentication of the data, to verify one, some, or all of the signatures depending on the ability of the relying party to support the algorithms used for keys and signatures. Few years later, the trust in one of the used algorithms is compromised. At the same time, one of the other algorithms used in the PKI is to be abandoned (e.g., the RSA algorithm) but the combined algorithm with a strong symmetric one might still be used (e.g., a combined key with RSA and a Symmetric Key). The systems and methods described herein addresses the above cases.

There are two methods of revocation a Certificate Revocation List (CRL) and the Online Certificate Status Protocol (OCSP). The CRL is a list of revoked certificates (by serial number) that have been issued and then subsequently revoked by a given CA. CRLs are generally published on a periodic interval or can be published only when a certificate is revoked by the CA. The composite crypto structures support both methods.

An important note is about the use of this revocation mechanism instead of revoking single certificates. Specifically, when a crypto algorithm needs to be replaced because of possible security risks and compromises, CAs must revoke every single certificate that make use of this algorithm to protect the entire ecosystem against abuses. This comes with very high costs related to adding many certificates to the revoked lists—both CRLs and OCSP servers are impacted by these massive revocations. The revocation mechanism described in this disclosure provides a very efficient way to mass-revoke certificates when and if needed.

In order to be able to revoke specific algorithm configurations, this disclosure provides two different mechanisms based on two different approaches. It is possible to implement the two mechanisms with a single data structure (e.g., by adding the optional Boolean values from the second mechanism to the first one), however they are kept separated below to highlight the different use-cases and scope.

Specifically, a first mechanism to revoke key configurations is where the configuration of the key can be expressed as a chain of object identifiers (e.g., "RSA OID" or "COMPOSITE CRYPTO, RSA OID" or, again, "COMPOSITE CRYPTO, COMBINED CRYPTO, RSA OID"). The second mechanism uses a single Object Identifier or OID (the algorithm's OID), and uses two Boolean values (allowInCompositeKeys and allowInCombinedKeys) to further qualify the deprecation.

The first mechanism focuses on revoking specific key configurations. For example, an administrator might want to deprecate the use of RSA as a primary key or as a component of a Composite Key, but still allow the RSA to be used in combined keys (e.g., RSA+AES or RSA+PostQuantum Algorithm). For each of the key configuration that the CA wants to deprecate or revoke, the CA generates an entry in the KeyConfigurationRevocationList. The list is then embedded as extensions in OCSP responses and CRLs that are issued from the CA (or the delegated signer).

The ("KeyConfigurationRevocationList") is a sequence of ("KeyConfigurationRevocation-Data") entries. Each of these entries provides information about how to uniquely identify the specific key configuration ("RSA" or "CompositeCrypto;RSA", and provides an optional trust period for the algorithm (notBefore and notAfter). An optional indication for the algorithm is to not be trustable in any configuration (i.e., as a primary algorithm, as part of a composite key, or as part of a combined key). The KeyConfigRevocationList data structure and associated identifier(s) are defined as follows:

```
keyConfigRevocationList-id   OBJECT      IDENTIFIER          :=
        {iso(1)   identified-organization(3)     dod(6)        internet(1)
        private(4) enterprise(1) OpenCA(18227) 13 }
KeyConfigId ::=1..MAX OF OBJECT_IDENTIFIER
KeyConfigRevocationData                ::=            SEQUENCE      {
        keyConfig                                   KeyConfigId,
        ---  Identifier  of  the  specific  Key  Configuration
        ---      identified   by   this   data   structure
        doNotUseBeforeDate        [0]       GENERALIZED_TIME
OPTIONAL,
        ---  Time  before  which  the  key  configuration
        ---        should        not       be          used
        doNotTrustAferDate  [1] GENERALIZED_TIME  OPTIONAL,
        ---  Timestamp  after  which  the  key  configuration
        --- identified  by  keyConfig  should  not  be  trusted
        --- by the ecosystem clients anymore }
```

-continued

```
KeyConfigRevocationList      ::=        SEQUENCE    (1..MAX)    OF
    KeyConfigRevocationData
```

In order to deprecate an algorithm that was used in certificates (e.g., RSA), the data structure carries the RSA algorithm identifier as the keyConfig. This configuration would not prevent, however, the use of the RSA algorithm inside composite or combined keys because the algorithm identifier would be different.

To deprecate the use of RSA as a primary key in the certificate and as a component of composite Keys (but leaving the possibility to leverage RSA in a combined Key), the CA would generate two entries. The first one would carry the identifier for the RSA algorithms to deprecate its use as a primary key. The second one would carry the sequence "Composite Crypto OID"+"RSA algorithm OID" to identify the use of the specific deprecated configuration (i.e., using RSA inside composite crypto keys).

The CA can use this mechanism also to deprecate the use of composite crypto or combined crypto within the ecosystem. For example, in order to deprecate the use of composite crypto after it is not required anymore in the infrastructure, the CA can generate a ("KeyConfigRevocationData") entry where the ("keyConfigId") carries only the composite crypto") object identifier.

The Algorithm Revocation is very similar and provides the same type of options. The data structure, in this case, provides additional Boolean value(s) that indicate if the specific algorithm OID is to still be allowed Combined Keys. The other difference lies in the algorithmId (equivalent of the keyConfig field in the previous mechanism) which now is a single-valued OID instead of a SEQUENCE of OIDs. The AlgorithmRevocationList data structure and associated identifier(s) are defined as follows:

When a CA wants to revoke an algorithm, it will generate a KeyAlgorithmRevocationData entry for it. If the algorithm is still to be allowed in Combined Keys, the ("allowInCombined") Boolean value can be used to do so (set to TRUE).

When many certificates might be compromised at once, revoking individual entries is very inefficient and might lead to complex procedures and uncertainty. Therefore, the above mechanism can be extended to provide other mass-revocation options.

The identified revocation mechanism for key configurations can be extended to other fields in the certificates. By identifying the specific field and value (if any) that is deprecated, all certificates that satisfy that requirement without having to specify individual serial numbers. For example, validity period can be considered, such as from January 1, 203 do not trust any certificate issued before 2010. In another example, extensions value can be used to not trust any certificate that carries the policy extension with a value of 1.2.3.4.5.6.7. In a further example, the subject value can be used to not trust any certificate that has the commonName field inside the certificate.

Specifically, the mechanism described above allows to identify specific key configurations, to identify certificates by other characteristics like a hashing algorithm (e.g., "do not trust any signatures that use sha1"), the validity period (e.g., "do not trust any certificate issued from X to Y" or "do not trust certificates issued before Z"), the serial numbers (e.g., "do not trust any certificates with serial numbers between A and B"), a specific value of the subject (or a sub-field of the subject like an OU value) (e.g., "do not trust any certificate with O=Evil Org One"), the presence of a specific extension (e.g., "do not trust any certificate that carried the 'R' extension") or, again, a specific value of an extension (e.g., "do not trust any certificate that carries the 'W' extension with value 'K'"—"do not trust any certificate that carry the 'policy' extension with value '1.3.4.5.6.7.8.9').

The extension for mass revocation can be defined as follows:

```
algorithmRevocationList-id    OBJECT    IDENTIFIER          ::=
        {iso(1)    identified-organization(3)    dod(6)    internet(1)
        private(4) enterprise(1) OpenCA(18227) 14 }
AlgorithmRevocationData        ::=         SEQUENCE              {
        algorithmId                     OBJECT_IDENTIFIER,
        --- Identifier    of    the    specific    Algorithm
        doNotUseBeforeDate     [0]    GENERALIZED_TIME
    OPTIONAL,
            ---    Timestamp    before    which    the    algorithm
            ---    should    not    be used    in    the    ecosystem
    doNotTrustAferDate    [1] GENERALIZED_TIME OPTIONAL,
            ---    Timestamp    after    which    the    identified    algorithm
            ---    should    not    be    trusted    by    the    ecosystem    clients
            ---                                                anymore
allowInCombined                         BOOLEAN OPTIONAL,
            ---    When    set    to    True,    the    identified    algorithm
            --- is still allowed in combined keys }
AlgorithmRevocationList      ::=        SEQUENCE    (1..MAX)    OF
    AlgorithmRevocationData
```

```
massRevocationList-id        OBJECT        IDENTIFIER          ::=
        {iso(1)   identified-organization(3)   dod(6)   internet(1)
        private(4)   enterprise(1)   OpenCA(18227)      15      }
        CertificateField          ::=              CHOICE         {
            subject                                          (0),
            issuer                                           (1),
            startDate                                        (2),
            endDate                                          (3),
            serialNumberStart(4),
            serialNumberEnd(5),
            extensionType(6),
            extensionValue(7)
        }
CertificateField         ::=           SEQUENCE              {
        targetField                              CertificateField,
        targetValue               OCTET_STRING   OPTIONAL
}
CertificateFieldList ::= SEQUENCE (1..MAX) OF CertificateField
MassRevocationData          ::=          SEQUENCE            {
        targetList                          CertificateFieldList,
        ---    Target  entries  and  values.  All  conditions
        ---   in  the  list  must  verify  together  (logic  'AND')
        ---   for  multiple  separated  requirements,  use  multiple
        ---             MassRevocationData entries
        startPeriod      [0]  GENERALIZED_TIME        OPTIONAL,
        ---   start  of  the  distrust  period,  if  none  is  used
        ---   the  start  period  is  assumed  in  the  past
        endPeriod        [1]  GENERALIZED_TIME        OPTIONAL,
        --- end  of  the  distrust  period,  if  not  is  used
        --- the end period is assumed in the future }
MassRevocationList ::= SEQUENCE (1..MAX) OF MassRevocationData
```

Using the above system and method, not only can the CRL and/or OCSP response state what is not valid, but also what is currently valid. The CA is providing a set of instructions for how the crypto library should process the information inside the certificate. This approach can be extended to deliver a specific set of requirements that define the parameters for certificate validation. The parameters for the validation of the certificate profiles can be directly taken from the governing certification policy where the allowed profiles are specified, instead of just the disallowed profiles.

The mechanism used to identify key configurations that are not trusted can be used to specify machine-readable validation requirements from the PKI governing authority. Specifically, a new extension is defined, the ("Validation-Control") extension, that provides an optional identifier for the specific certificate profile or policy followed by a sequence of tuples that specify what values are expected for different fields of the certificate.

An example definition for the ("ValidationControl") extension is as follows:

```
ValidationControl              ::=           SEQUENCE             {
                targetProfile                       CertificateProfileIdentifier,
                ---                Object                     Identifier
                ---  for  multiple  separated  requirements,  use  multiple
                validationData                           ValidationTuples,
                --- Sequence of ValidationTuples
An example tuple can be described as the sequence of the following data:
ValidationData ::= SEQUENCE (1..MAX) of ValidationTuple
FieldOperation ::= CHOICE {
        exists(0),
                --- Checks existance (Unary Op)
equalTo(0),
                ---     Checks      the      value      (Binary      Op)
        lessThanValue(1),
                ---     Value     Condition      (Binary      Op)
        greaterThanValue(2),
            --- Value Condition (Binary Op)
        lengthOf(3),
                ---     Checks      the      length      of      the      Field
        lessThanLength(4),
                ---    Field    Length    Condition    (Binary    Op)
        greaterThanLength(5),
            --- Field Length Condition (Binary Op)
onDateTime(6),
                ---           Checks        on        DateTime        Fields
        beforeThanDateTime(7),
                ---          DateTime      Condition      (Binary      Op)
        afterThanDateTime(8),
            --- DateTime Condition (Binary Op)
    ...
}
```

-continued

```
ValidationTuple ::= SEQUENCE {
      target                    OBJECT                    IDENTIFIER,
            --- Target Element in the Certificate
      selectedOperation                  FieldOperation,
            --- Operation to apply to the field
value                         ANY         DEFINED         BY       target
      ---       Value Field, the type depends on the
      ---    target identifier (e.g., INTEGER, OCTET STRING,
      --- etc.)
}
``` where the ("Target OID") is the specific field in the certificate (i.e., a field of the certificate subject or a specific extension), the ("Operation") is the type of operation needed to validate the field's value (e.g., ("Exists"), ("Greater Than"), ("Shorter Than"), ("Equivalent To")), and the ("Target Value") is the value used for binary ("Operation")s. For unary operators (e.g., ("Exists") the value used is from the specified field in the certificate.

This new approach defines a new extension that contains a set of identifiers and values that define the configuration of specific certificate profiles. Both 'AND' and 'OR' logic must be implemented in the structure and the associated processing rules. The validation rules can then be used to validate the certificate profile instead of relying solely on the revocation mechanism to distrust certificates. For example, if the requirements are not met, the certificate is not to be trusted versus if the requirements are met, the certificate is not to be trusted. A certificate profile OID could be used in certificates to easily validate them against the correct set of rules.

This approach allows the certificates to be managed dynamically, such that using the time frames, the OCSP responses and CRLs can change how they affect the certificates by changing which types or attributes of certificates are currently valid during different time ranges.

In some embodiments, the CRLs may be signed with composite signatures as described above. In the case of X.509 certificates, the 'signatureAlgorithm' field in the 'CertificateList' structure is set to 'compositeSignatures' and the 'parameters' field is set to NULL. The 'signature' field of the 'CertificateList' is set to the DER representation of the 'CompositeSignaturesValue' that contains all of the signatures generated with the 'compositeKeys' in the signer's certificate.

OCSP requests include an option 'Signature' field, which allows for authentication of the request. In this case, the composite crypto structure may be used to authenticate the OCSP request by using 'CompositeSignatures.' In particular, the 'signatureAlgorithm' algorithm identifier in the 'Signature' structure of the "OCSPRequest' is set to 'compositeSignatures' and the parameters field is set to NULL. The corresponding 'signature' field of the 'Signature' structure is set to the DER representation of the "CompositeSignaturesValue' that contains all of the signatures generated with the 'compositeKeys' in the signer's certificate. The signatures would be calculated as described above.

OCSP response may also be authenticated with a digital signature. The 'BasicOCSPResponse' structure includes 'signatureAlgorithm' and 'signature' field that are compatible with composite signatures. For OCSP responses, the 'signatureAlgorithm' algorithm identifier in the 'BasicOCSPResponse' structure is set to 'compositeSignatures' and the 'parameters' field is set to NULL. The corresponding 'signature' field is set to the DER representation of the 'CompositeSignaturesValue' that contains all of the signatures generated with the 'compositeKeys' in the signer's certificate.

In another embodiment, the composite crypto structures may be used with certificate requests (CSRs). CSRs are usually in the form of a PKCS #10 message. The 'CertificateRequest' structure includes 'signatureAlgorithm' and 'signature' fields that can be used to authenticate the CSRs. In particular, the 'signatureAlgorithm' algorithm identifier in the 'CertificateRequest' structure is set to 'compositeSignatures' and the 'parameters' field is set to NULL. The corresponding 'signature' field is set to the DER representation of the 'CompositeSignaturesValue' that contains all of the signatures generated with the 'compositeKeys' associated with the identity that is requesting a certificate.

In a further embodiment, the composite signatures may be used with the Cryptographic Message Syntax (CMS). The CMS format includes the 'signatureAlgorithm' and 'signature' fields of the 'SignerInfo' structure. In particular, the 'signatureAlgorithm' algorithm identifier in the 'SignerInfo' structure is set to 'compositeSignatures' and the parameters field is set to NULL. The corresponding 'signature' field is set to the DER representation of the 'CompositeSignaturesValue' that contains all of the signatures generated with the 'compositeKeys associated with the signer (e.g., the 'CompositeSubjectKeyInfo' in the signer's certificate).

Other Considerations

Many block chain technologies use PKIs to authenticate transactions. The binary field used to carry signature values for these blockchain technologies allow for the use of composite signatures to protect the signed data by using multiple keys associate with a single identity.

In addition, there are mechanisms to identify basic keys that compose the compositePublicKey or combinedPublicKey in a certificate. The definition of an extended subjectKeyIdentifier where the identifiers for the basic SubjectPublicKeyInfo structures that compose the CompositePublicKey or CombinedPublicKey (each of which relate to one of the basic keys) are listed. This allows for the easy identification of the compromised basic keys across certificates. This definition may be expressed as:

```
ExtendedSubjectKeyIdentifier::=SEQUENCE OF
      (1 . . . MAX) KeyIdentifier---The KeyIdentifier
      is an OCTET STRING
``` where the value of each KeyIdentifier is the KeyIdentifier for a basic key in the compositePublicKey or combinedPublicKey.

The two different type of multiple key certificates—the combined and composite certificates—provide an indication for how to use multiple keys for encryption purposes. An example of a practical use of encryption is in S/MIME protocol where messages can be signed and/or encrypted. We use this protocol to provide the procedures for how to encrypt and decrypt for this new paradigm and which advantages it provides throughout this section.

Whenever some data needs to be encrypted, usually a single public key is used to wrap the symmetric encryption key. When composite or combined crypto is used, the crypto libraries need to follow the prescriptions coming from the provided key structure for how to protect the symmetric encryption key.

The Secure MIME standard (secure e-mail) provides the possibility to authenticate (sign) and/or encrypt messages and data. Therefore, composite crypto and combined crypto keys can be used not only to authenticate the data and messages, but also to encrypt data, if that is supported by the individual keys that are inside the multi-key structure used.

Specifically, when a message is to be encrypted for a composite key, the message encryption key is encrypted separately—thus allowing the recipient to leverage the algorithm of its choice. Depending on the environment where this is used, if any of the keys in the composite key do not support encryption, either the overall key will not be able to support encryption or the encryption key will be protected by using only the other keys.

This allows receiving parties to rely on the specific algorithm they prefer. When encrypting a message or some data, the entity that is performing the encryption should check the validity of the certificate to make sure the key being used to encrypt the data is not already compromised. When using the revocation extensions described above, the entity that encrypts the data can check, via the use of the revocation system, if an algorithm and/or a key configuration is not deemed secure anymore. If that is the case, the entity performing the encryption shall refuse to encrypt for compromised algorithms or key configurations.

The underlying principle and logic operation across the keys in a composite key structure is the "OR" operation. This also applies to decrypting the data. Specifically, the recipient of the encrypted data can use any of the private keys in its possession, that support the encryption operation, to decrypt the data (i.e., usually the symmetric encryption key).

When a message is encrypted for combined crypto, the encryption key must be encrypted by using all the keys in the combined key in such a way that, in order to reveal the encryption key, all keys must be used in the process (e.g., encapsulated encryption where keys are taken in the same order in which they appear in the combined key structure and apply subsequent level of encryption—similar to the layers in an onion). This allows recipients to rely on all the algorithms inside the combined key, thus leveraging the protection from all of them.

Similarly, to the previous case, the use of the revocation system allows the entity that is doing the encryption to avoid encrypting for key configurations that are known to be vulnerable. Specifically, after checking the status of the keys that are going to be used for protecting the encryption key, if all of the key configurations used to encrypt the data are revoked, the encryption process should fail. Differently from the composite case, though, if any of the key in the combined key structure does not support encryption and/or its configuration has been revoked, the encryption process should fail. This is consistent with the underlying logical idea that the security of combined keys requires the use of all of them (similarly to what happens for authentication).

Alternatively, in case less stringent encryption policies in effect (encryption algorithm failures seem to be less frequent that authentication algorithm failures) and any of the keys in the combined key structure used to encrypt the data is still valid (i.e., at least one key is not compromised), the combined encryption can still complete successfully as the non-revoked key configuration(s) will still provide, at least, one level of secure encryption.

In case the size of the data to be encrypted poses issues for the subsequent encryptions, symmetric keys can be used as intermediaries. Specifically, first the data (i.e., the data to be encrypted or the previous layer of encryption) is encrypted by using a symmetric algorithm (e.g., AES-256) and then the key is then encrypted with the public key inside the Combined Key sequence.

When using combined keys, the security assumptions are different than the composite keys use-case. The underlying principle and logic operation across the keys in a combined key structure is the "AND" operation. Therefore, the protection comes from the use of all the component keys.

Specifically, the recipient of the encrypted data will use each private key corresponding to each component keys in the recipient's Combined Key structure to decrypt the subsequent layers of encapsulated encryption in the order they appear in the encryption (which is usually the order in which the keys appear in the combined key sequence). A failure in decrypting any of the different layers result in the impossibility of decrypting the message FIG. 1 is a schematic illustration of a composite signature process 100 and the data structures used with the composite signature process, according to an embodiment. In process 100, a signing party 102 generates a digital certificate 104 that is conveyed to a relying party 106. In some embodiments, the signing party 102 and the relying party 106 are in communication. In other embodiments, the relying party 106 is not in communication with the signing party 102. In some embodiments, the signing party 102 is a trusted Certificate Authority (CA) or other certificate issuer. In the exemplary embodiment, one or both signing party 102 and relying party 106 are computing devices including at least one processor in communication with at least one memory device (not separately illustrated).

In the exemplary embodiment, the signing party 102 signs the digital certificate 104 using three Keys (Key K1 108, Key K2 110, and Key K3 112). In some embodiments, the three Keys 108, 110, and 112 use the same cryptographic scheme with different hashing algorithms (e.g., one signature could be RSAwithSHA256 and another signature could be RSAwithSHA512). In other embodiments, the three Keys 108, 110, and 112 use different cryptographic schemes with the same hashing algorithm (e.g., one signature could be with RSAwithSHA256 and another could be ECDSAwithSHA256). In still other embodiments, the three Keys 108, 110, 112 may be use a combination of the two strategies (e.g., K1 may use RSAwithSHA256, K2 may use RSAwithSHA512, and K3 may use ECDSAwithSHA256.

In the exemplary embodiment, the signing party 102 uses the three keys 108, 110, and 112 to generates a CompositeSignature 114 to include three Signatures (Signature S1 116, Signature S2 118, and Signature S3 120). The signing party 102 generates the three Signatures S1 116, S2 118, and S3 120 using the three respective keys K1 108, K2 110, and K3 112. Each of the signatures S1 116, S2 118, and S3 120 includes a secret or public key for decrypting messages.

The signing party 102 places the first signature S1 116 first in the CompositeSignature 114. The signing party 102 places the second signature S2 118 second in the CompositeSignature 114. And the signing party 102 places the third signature S3 120 third in the CompositeSignature 114. The signing party 102 also places information about the three keys KT 108, K2 110, and K3 112 in the digital certificate 104. In some embodiments, the signing party 102 includes the PublicKeys KT 122, K2 124, and K3 126 in the digital certificate 104. The PublicKeys KT 112, K2 124, and K3 126 are associated with keys KT 108, K2 110, and K3 112, respectively.

The relying party 106 receives the digital certificate 104, such as from a website. The relying party 106 retrieves the PublicKeys KT 112, K2 124, and K3 126 from the digital certificate 104. The relying party 106 validates each of the Signatures S1 116, S2 118, and S3 120 with the provided PublicKeys K1 112, K2 124, and K3 126, respectively. In some embodiments, the relying party 106 checks a CRL or performs an OCSP request to confirm the validity of the digital certificate 104. As a part of validating the digital certificate 104, the relying party 106 confirms the validity of the three PublicKeys K1 112, K2 124, and K3 126 and their corresponding algorithms prior to validating the Signatures S1 116, S2 118, and S3 120.

In some embodiments, the relying party 106 is only capable of performing the cryptographic validation of one or more of the Signatures S1 116, S2 118, and S3 120, rather than all of them. This may be the case where the relying party 106 has a limited cryptographic suite.

In some further embodiments, the signing party 102 sets a threshold value for the number of signatures S1 116, S2 118, and S3 120 that need to be validated to validate the digital certificate 104. In these embodiments, a threshold could be two signatures, where there are three signatures associated with the digital certificate 104. As long as the relying party 106 can validate at least two signatures, then the digital certificate 104 is valid and kay be used. If two of the three keys have been revoked, then the digital certificate 104 is invalid. In another example, the digital certificate 104 could have seven key, where five are still valid. As long as the validity threshold is five or less, then the digital certificate 104 is still considered valid. In at least one embodiment, the threshold is set by the signing party 102.

In some further embodiments, the CRL or OSCP response can include a message indicating that all X threshold digital certificates are no longer valid. Or the message can indicate that all X threshold digital certificates are now Y threshold, e.g., raising the threshold from two to three.

In some further embodiments, different systems/devices/networks could have different security levels, where each level is defined by a corresponding threshold for the number of valid signatures on the digital certificates 104 used with that system/device/network.

The digital certificate 104 can have any number of keys, each potentially associated with a different encryption methodology. For example, a digital certificate could be associated with twenty different keys and contain 20 different signatures.

Figure 2:
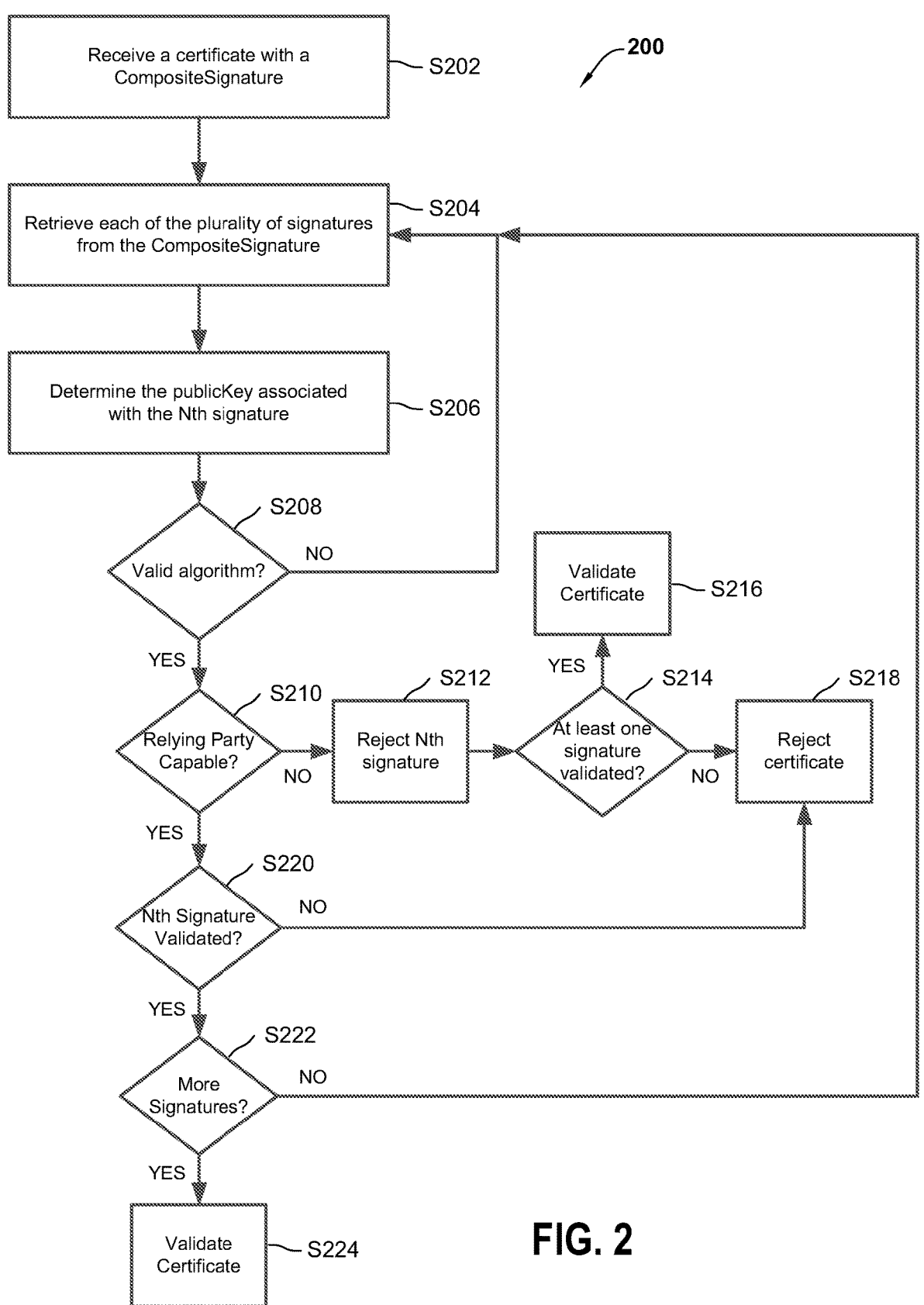
FIG. 2 is a schematic illustration of a composite signature validation process in accordance with the composite signature process and the data structures shown in FIG. 1.

FIG. 2 is a schematic illustration of a composite signature validation process 200 in accordance with the composite signature process 100 and the data structures (shown in FIG. 1). In the exemplary embodiment, process 200 is performed by the relying party 106 (shown in FIG. 1).

In the exemplary embodiment, the relying party 106 receives S202 a digital certificate 104 with a CompositeSignature 114 (both shown in FIG. 1). The relying party 106 retrieves S204 each of the Signatures S1 116, S2 118, and S3 120 (all shown in FIG. 1) from the CompositeSignature 114. For each one of the Signatures S1 116, S2 118, and S3 120, the relying party 106 determines S206 the PublicKey associated with the signature. For example, PublicKey K2 124 is associated with Signature S2 118. In the exemplary embodiment, relying party 106 starts with the first Signature S1 116 and continues through the signatures in their order in the CompositeSignature 114.

The relying party 106 determines S208 whether or not the algorithm associated with the current key and signature is still valid. This may be by determining whether the algorithm has been revoked, such as by comparing the algorithm to a CRL or OCSP response. If the algorithm is not valid, the relying party 106 moves on to the next key in the CompositeSignature 114.

If the algorithm is valid, the relying party 106 determines S210 if it is capable of validating the signature using that algorithm. This check is to determine if the relying party 106 has the cryptographic capability to handle the algorithm. If the relying party 106 is not capable, then the relying party 106 rejects S212 the current signature. If the relying party 106 validated S214 at least one of the signatures in the CompositeSignature 114, then the relying party 106 validates S216 the digital certificate 104. If the relying party 106 has not validates S214 at least one signature, then the relying party 106 rejects S218 the digital certificate 104. For example, a relying party 106 may only be able to process RSA encryption and Signatures S1 116 and S2 118 are encrypted using RSA, while S3 120 is encrypted with EC. Then if the relying party 106 validated at least one of the RSA signatures, the relying party 106 may S216 validate the digital certificate 104. In some embodiments, Steps S214, 216, and 218 are performed after all of the Signatures S1 116, S2 118, and S3 120 have been put through the validation process. In these embodiments, after Step S212, the relying party 106 proceeds to validate the next signature.

In the exemplary embodiment, the relying party 106 determines S220 if the signature is valid using the associated PublicKey. If the signature is not valid, then the relying party 106 may reject S218 the digital certificate 104. If the signature is valid, the relying party 106 determines S222 if there are more signatures to validate. If there are, then the relying party 106 proceeds to the next signature in the CompositeSignature. If there are no more signatures to process, the relying party 106 may validate S224 the digital certificate 104. In some embodiments, the relying party 106 may validate S224 the digital certificate 104 if it validated all of the signatures that it was capable of, aka those whose algorithms it supported and had not been revoked.

Figure 3:
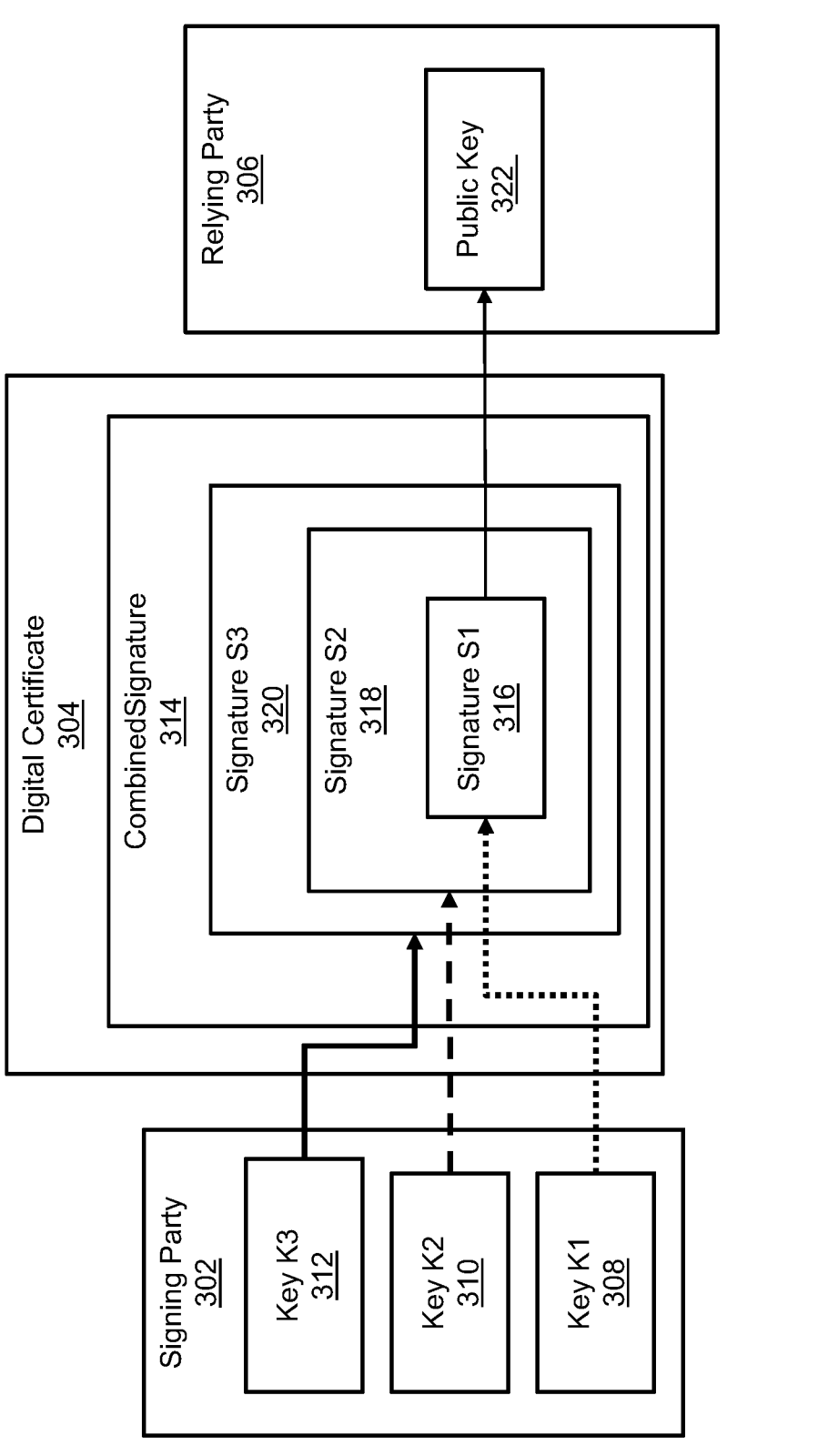
FIG. 3 is a schematic illustration of a combined signature process and the data structures used with the combined signature process, according to an embodiment.

FIG. 3 is a schematic illustration of a combined signature process 300 and the data structures used with the combined signature process, according to an embodiment. In process 300, a signing party 302 generates a digital certificate 304 that is conveyed to a relying party 306. In some embodiments, the signing party 302 and the relying party 306 are in communication. In other embodiments, the relying party 306 is not in communication with the signing party 302. In some embodiments, the signing party 302 is a trusted Certificate Authority (CA) or other certificate issuer. In the exemplary embodiment, one or both signing party 302 and relying party 306 are computing devices including at least one processor in communication with at least one memory device (not separately illustrated).

In the exemplary embodiment, the signing party 302 signs the digital certificate 304 using three Keys (Key K1 308, Key K2 310, and Key K3 312). In some embodiments, the three Keys 308, 310, and 312 use the same cryptographic scheme with different hashing algorithms (e.g., one signature could be RSAwithSHA256 and another signature could be RSAwithSHA512). In other embodiments, the three Keys 308, 310, and 312 use different cryptographic schemes with the same hashing algorithm (e.g., one signature could be with RSAwithSHA256 and another could be ECDSAwith-SHA256). In still other embodiments, the three Keys 308, 310, 312 may be use a combination of the two strategies (e.g., K1 may use RSAwithSHA256, K2 may use RSAwith-SHA512, and K3 may use ECDSAwithSHA256.

In the exemplary embodiment, the signing party 302 uses the three keys 308, 310, and 312 to generates a Combined-Signature 314 to include three Signatures (Signature S1 316, Signature S2 318, and Signature S3 320). In the Combined-Signature 314, Signature S1 316 was created by signing or encrypting the public key 322 or secret using key K1 308. Signature S1 316 was then signing or encrypting by key K2 310 to create Signature S2 318. Signature S2 318 was then signing or encrypting by key K3 312 to create Signature S3 320. In some embodiments, Signature S3 320 is stored as the CombinedSignature 314. In other embodiments, Signature S3 320 is further signing or encrypting to be stored as the CombinedSignature 314. In some embodiments, the signing party 302 checks a CRL or performs an OCSP request to confirm the validity of the keys K1 308, K2 310, and K3 312 prior to generating the signatures S1 316, S2 318, S3 320 and/or the CombinedSignature 314. In some further embodiments, the signing party 302 can use a revoked key as one of the keys in the CombinedSignature 314 and still consider the CombinedSignature 314 to be valid, such as an RSA, which can still be used but is not considered to enhance the security. This may be useful to allow for backwards compatibility for some of the digital certificates 304.

The signing party 302 places the CombinedSignature 314 in the digital certificate 304. The signing party 302 also places information about the three keys K1 308, K2 310, and K3 312 in the digital certificate 304.

The relying party 306 receives the digital certificate 304, such as from a website. The relying party 206 retrieves the keys K1 308, K2 310, and K3 312 from the digital certificate 304. The relying party 306 validates each of the Signatures S1 316, S2 318, and S3 320 with the provided keys K1 308, K2 310, and K3 312, respectively. In some embodiments, the relying party 306 checks a CRL or performs an OCSP request to confirm the validity of the digital certificate 304. As a part of validating the digital certificate 104, the relying party 106 confirms the validity of the three PublicKeys K1 112, K2 124, and K3 126 and their corresponding algorithms prior to validating the Signatures S1 116, S2 118, and S3 120.

In the exemplary embodiment, the relying party 306 has to decrypt all of the signatures S1 116, S2 118, and S3 120 to validate the digital certificate and retrieve the public key 322 or secret.

In some further embodiments, the public key 322 or secret is broken into shards or parts. In these embodiments, the shards are each separately encrypted using a different key K1 308, K2 310, and K3 312. In these embodiments, the relying party 306 has to decrypt each shard using the corresponding key and then combine the decrypted shards. In these embodiments, the shards can be decrypted in parallel by the processor(s).

In the combined crypto embodiment, a message is encrypted using the public key 322. The relying party 306 has to validate and decrypt the CombinedSignature 314 to retrieve the public key 322. In contrast, in a composite crypto embodiment, the message is encrypted with using the secret or public key. The relying party 106 only has to validate and decrypt one of the signatures S1 116, S2 118, and S3 120 to retrieve the secret or public key to decrypt the message.

As described above, composite crypto requires at least one key to be valid for the corresponding certificate or container to be valid. On the other hand, combined crypto requires all of the keys to be valid for the corresponding certificate or container to be valid. Accordingly, the combined crypto provides stronger security, while the composite crypto is computationally faster. This allows the systems to determine their level of security based on their capabilities.

In some embodiments, composite crypto and combined crypto can be used together. For example, a digital certificate/container may include a plurality of signatures that are each double encrypted using different combinations of keys, where each signature includes the same secret or public key. In another embodiment, in one layer of a combined signature, there may be multiple signatures using different keys that allow the receiving party to use different keys to retrieve the secret and/or public key. These aforementioned systems allow for combined crypto inside of a composite crypto and a composite crypto inside of a combined crypto.

While the above description lists one or more specific cryptographic algorithms, one having skill in the art would understand that other cryptographic algorithms may be used. For example, in the algorithmIdentifier field, SHA-256 may be identified as being used. However, the system explicitly allows support for any number of other algorithms to be used herein. The above systems describe multiple different potential security considerations to improve the security of the digital certificates and provide for extended life and expanded use possibilities for these certificates. Other security considerations would be known to ones having skill in the art.

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

The exemplary embodiments provided herein describe a system for enhanced public key encryption infrastructure that allows for expanded encryption options, that is advantageously disposed within one or more of the computer device and the certificate authority. The system thus functions as a verification system capable of: (i) allowing certificates to still be used after one of their cryptographic algorithms have been revoked; (ii) supporting multiple encryption methods, simultaneously; (iii) supporting different devices that have different cryptographic capabilities; (iv) providing support for quantum resistant cryptographic techniques; (v) allowing for backwards compatibility with existing systems; and (vi) limiting the required changes to existing digital certificate data structures to provide enhanced encryption options.

The aspects described herein may be implemented as part of one or more computer components such as a client device and/or one or more back-end components, such as a relying party and signing party, for example. Furthermore, the aspects described herein may be implemented as part of computer network architecture and/or a cognitive computing architecture that facilitates communications between various other devices and/or components. Thus, the aspects described herein address and solve issues of a technical nature that are necessarily rooted in computer technology.

For instance, aspects include analyzing the multiple signatures of digital certificates to ensure the security of those digital certificates and allow them to be used by multiple devices with different cryptographic capabilities. Furthermore, these aspects reduce the chance of data compromise and extend the lifespan of digital certificates. Without the improvements suggested herein, additional processing and memory usage would be required to perform such activities. Additional technical advantages include, but are not limited to: i) allowing certificates to still be used after one of their cryptographic algorithms have been revoked; ii) supporting multiple encryption methods, simultaneously; iii) supporting different devices that have different cryptographic capabilities; iv) providing support for quantum resistant cryptographic techniques; v) allowing for backwards compatibility with existing systems; and vi) limiting the required changes to existing digital certificate data structures to provide enhanced encryption options. Additional technical advantages are described in other sections of the specification.

The methods and systems described herein may be implemented using computer programming or engineering techniques including computer software, firmware, hardware, or any combination or subset thereof, wherein the technical effects may be achieved by performing at least one of the following steps: (a) receive a digital certificate including a composite signature field including a plurality of signatures, wherein the plurality of signatures include at least a first signature and a second signature; (b) retrieve, from the digital certificate, a first key associated with the first signature from the digital certificate; (c) retrieve the first signature from the composite signature field; (d) validate the first signature using the first key; (e) retrieve, from the digital certificate, a second key associated with the second signature; (f) retrieve the second signature from the composite signature field; (g) validate the second signature using the second key; (h) retrieve, from the digital certificate, a third key associated with the third signature of the plurality of signatures; (i) retrieve the third signature from the composite signature field; (j) validate the third signature using the third key; (k) determine a first cryptographic algorithm associated with the first key; (l) determine if the first cryptographic algorithm is valid; (m) determine if the first cryptographic algorithm is valid based on at least one of an Online Certificate Status Protocol (OCSP) and a Certificate Revocation List (CRL); (n) determine if the computer device is capable of processing the first algorithm; and (o) determine a second cryptographic algorithm associated with the second signature, wherein the first cryptographic algorithm and the second cryptographic algorithm are different.

The technical effects may also be achieved by performing at least one of the following steps: (a) generate a first signature using a first key and a first cryptographic algorithm; (b) generate a second signature using a second key and a second cryptographic algorithm; (c) combine the first signature and the second signature into a composite signature; (d) generate a digital certificate including the composite signature in a single field, wherein the composite signature includes a first signature, a second signature, and a third signature; (e) store the first key in a first field of the plurality of fields and a first identifier for the first cryptographic algorithm in a second field of the plurality of fields; and (f) store the second key in a third field of the plurality of fields and a second identifier for the second cryptographic algorithm in a fourth field of the plurality of fields, wherein the single field is a fifth field of the plurality of fields, and wherein the first cryptographic algorithm and the second cryptographic algorithm are different.

Additionally, the technical effects may be achieved by performing at least one of the following steps: a) receive a digital certificate including a combined signature field including a plurality of signatures, wherein the plurality of signatures include at least a first signature and a second signature, wherein an innermost signature of the plurality of signatures includes at least one of a secret or a public key for decrypting a message; b) retrieve, from the digital certificate, a first key associated with the first signature from the digital certificate; c) retrieve the first signature from the composite signature field; d) validate the first signature using the first key; e) decrypt the first signature to retrieve the second signature; f) retrieve, from the digital certificate, a second key associated with the second signature; g) validate the second signature using the second key; h) decrypt the second signature to retrieve a third signature of the plurality of signatures; i) retrieve, from the digital certificate, a third key associated with the third signature; j) validate the third signature using the third key; k) determine a first cryptographic algorithm associated with the first key; l) determine if the first cryptographic algorithm is valid; m) determine if the first cryptographic algorithm is valid based on at least one of an Online Certificate Status Protocol (OCSP) and a Certificate Revocation List (CRL); n) determine if the computer device is capable of processing the first algorithm; o) determine a second cryptographic algorithm associated with the second signature, wherein the first cryptographic algorithm and the second cryptographic algorithm are different; p) validate the digital signature if all of the plurality of digital signatures are validated; q) deny the digital signature if a signature of the plurality of signatures fails to validate; and r) include a revoked algorithm associated with one of the plurality of signatures.

Moreover, the technical effects may be achieved by performing at least one of the following steps: a) generate a first signature using a first key and a first cryptographic algorithm, wherein the first signature is generated to include a secret or a public key; b) generate a second signature using a second key, a second cryptographic algorithm, and the first signature, wherein the first cryptographic algorithm and the second cryptographic algorithm are different; c) add the second signature to a composite signature; d) generate a digital certificate including the composite signature in a single field, wherein the digital certificate includes a plurality of fields, wherein the single field is a fifth field of the plurality of fields; e) store the first key in a first field of the plurality of fields and a first identifier for the first cryptographic algorithm in a second field of the plurality of fields; f) store the second key in a third field of the plurality of fields and a second identifier for the second cryptographic algorithm in a fourth field of the plurality of fields; g) generate a third signature using a third key, a third cryptographic algorithm, and the second signature, wherein the third signature is the composite signature.

Furthermore, the technical effects may be achieved by performing at least one of the following steps: a) receive a digital certificate including a composite signature field including a plurality of signatures and a threshold, wherein the plurality of signatures include at least a first signature and a second signature, and wherein the threshold represents a number of valid signatures required; b) retrieve, from the digital certificate, a first key associated with the first signature from the digital certificate; c) retrieve the first signature from the composite signature field; d) validate the first signature using the first key; e) retrieve, from the digital certificate, a second key associated with the second signature; f) retrieve the second signature from the composite signature field; g) validate the second signature using the second key; h) compare a number of validated signatures; i) validate the digital certificate if the number of validated signatures meets the threshold based on the comparison; j) continue to validate signatures of the plurality of signatures until the number of validated signatures meets the threshold or all of the plurality of signatures have been analyzed; k) receive a revocation status message for one or more keys, wherein the revocation status message includes a threshold update; and l) update the threshold based on the threshold update, wherein the threshold update increases the threshold.

Furthermore, the embodiments described herein improve upon existing technologies, and improve the functionality of computers, by more accurately predict or identify the current status of digital certificates. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to computer security, for example.

Accordingly, the innovative systems and methods described herein are of particular value within the realm of secure Internet communications. The present embodiments enable more reliable updating and monitoring of such communications, but without compromising data and speed. Furthermore, according to the disclosed techniques, user computer devices are better able to monitor and determine the security of websites and other connected devices, and thereby protecting computer devices from malicious actors.

Exemplary embodiments of systems and methods for determining revocation statuses of digital certificates are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for enhanced public key infrastructure (PKI), comprising:
a computer device having at least one processor in communication with at least one memory device configured to store a plurality of instructions, which, when executed by the at least one processor, cause the at least one processor to:
receive a digital certificate including a first combined signature including a first signature of a plurality of digital signatures and a second combined signature including a second signature of the plurality of digital signatures and different from the first signature, wherein the first combined signature is encrypted with a first key and the second combined signature is encrypted with a second key, wherein the digital certificate includes a plurality of fields, and wherein the plurality of fields include (i) the first key in a first field of the plurality of fields, (ii) a first identifier for a first cryptographic algorithm in a second field of the plurality of fields, (iii) the second key in a third field of the plurality of fields, and (iv) a second identifier for a second cryptographic algorithm in a fourth field of the plurality of fields;
retrieve the first key associated with the first combined signature from the digital certificate;
decrypt the first combined signature using the first key to retrieve first signature and the second combined signature;
validate the first signature;
retrieve, from the digital certificate, a second key associated with the second combined signature;
decrypt the second combined signature using the second key to retrieve the second signature;
validate the second signature; and
deny the digital certificate upon failure to validate a signature of the plurality of digital signatures.

2. The system in accordance with claim 1, wherein the instructions further cause the at least one processor to:
decrypt the second combined signature using the second key to retrieve the second signature and a third combined signature including a third signature of the plurality of digital signatures;
retrieve, from the digital certificate, a third key associated with the third signature; and
validate the third signature.

3. The system in accordance with claim 1, wherein the instructions further cause the at least one processor to determine the first cryptographic algorithm associated with the first key.

4. The system in accordance with claim 3, wherein the instructions further cause the at least one processor to determine if the first cryptographic algorithm is valid.

5. The system in accordance with claim 4, wherein the instructions further cause the at least one processor to determine if the first cryptographic algorithm is valid based on at least one of an Online Certificate Status Protocol (OCSP) and a Certificate Revocation List (CRL).

6. The system in accordance with claim 3, wherein the instructions further cause the at least one processor to determine if the computer device is capable of processing the first cryptographic algorithm.

7. The system in accordance with claim 3, wherein the instructions further cause the at least one processor to determine the second cryptographic algorithm associated with the second signature, wherein the first cryptographic algorithm is different from the second cryptographic algorithm.

8. The system in accordance with claim 1, wherein the instructions further cause the at least one processor to validate the digital certificate if all of the plurality of digital signatures associated with the digital certificate are validated.

9. The system in accordance with claim 1, wherein an innermost signature of the plurality of digital signatures includes at least one of (i) a secret, and (ii) a public key for decrypting a message.

10. The system in accordance with claim 1, wherein the instructions further cause the at least one processor to include a revoked algorithm associated with one of the plurality of digital signatures.

11. A system for enhanced public key infrastructure (PKI), comprising:

a computer device having at least one processor in communication with at least one memory device configured to store a plurality of instructions, which, when executed by the at least one processor, cause the at least one processor to:

receive a digital certificate including a combined signature field having a plurality of nested signatures and a threshold, wherein the plurality of nested signatures includes at least a first signature and a second signature, wherein the threshold represents a number of valid signatures required, wherein the digital certificate includes a plurality of fields, and wherein the plurality of fields include (i) a first key in a first field of the plurality of fields, (ii) a first identifier for a first cryptographic algorithm in a second field of the plurality of fields, (iii) a second key in a third field of the plurality of fields, and (iv) a second identifier for a second cryptographic algorithm in a fourth field of the plurality of fields;

retrieve, from the digital certificate, the first key associated with the first signature from the digital certificate;

retrieve the first signature and a second combined signature from the combined signature field;

validate the first signature;

retrieve, from the digital certificate, a second key associated with the second signature;

retrieve the second signature from the second combined signature;

validate the second signature;

compare a number of validated signatures;

validate the digital certificate if the number of validated signatures meets the threshold based on the comparison; and deny the digital certificate upon failure to validate a signature of the plurality of digital signatures.

12. The system in accordance with claim 11, wherein the instructions further cause the at least one processor to continue to validate signatures of the plurality of nested signatures until the number of validated signatures meets the threshold or all of the plurality of nested signatures have been analyzed.

13. The system in accordance with claim 12, wherein the instructions further cause the at least one processor to:

receive a revocation status message for one or more keys, wherein the revocation status message includes a threshold update; and update the threshold based on the threshold update, wherein the threshold update increases the threshold.

14. A computing device for enhanced public key infrastructure (PKI), comprising:

a processor; and a memory device in communication with the processor, wherein the memory device is configured to store a plurality of instructions, which, when executed by the processor, cause the processor to:

receive a digital certificate including a first combined signature including a first signature of a plurality of digital signatures and a second combined signature including a second signature of the plurality of digital signatures and different from the first signature, wherein the first combined signature is encrypted with a first key and the second combined signature is encrypted with a second key, wherein the digital certificate includes a plurality of fields, and wherein the plurality of fields include (i) the first key in a first field of the plurality of fields, (ii) a first identifier for a first cryptographic algorithm in a second field of the plurality of fields, (iii) the second key in a third field of the plurality of fields, and (iv) a second identifier for a second cryptographic algorithm in a fourth field of the plurality of fields;

retrieve the first key associated with the first combined signature from the digital certificate;

decrypt the first combined signature using the first key to retrieve first signature and the second combined signature;

validate the first signature;

retrieve, from the digital certificate, a second key associated with the second combined signature;

decrypt the second combined signature using the second key to retrieve the second signature;

validate the second signature; and deny the digital certificate upon failure to validate a signature of the plurality of digital signatures.

15. The computer device in accordance with claim 14, wherein the instructions further cause the at least one processor to:

decrypt the second combined signature using the second key to retrieve the second signature and a third combined signature including a third signature of the plurality of digital signatures;

retrieve, from the digital certificate, a third key associated with the third signature; and validate the third signature.

16. The computer device in accordance with claim 14, wherein the instructions further cause the at least one processor to determine the first cryptographic algorithm associated with the first key.

17. The computer device in accordance with claim 16, wherein the instructions further cause the at least one processor to determine if the first cryptographic algorithm is valid.

18. The computer device in accordance with claim 17, wherein the instructions further cause the at least one processor to determine if the first cryptographic algorithm is valid based on at least one of an Online Certificate Status Protocol (OCSP) and a Certificate Revocation List (CRL).

19. The computer device in accordance with claim 16, wherein the instructions further cause the at least one processor to determine if the computer device is capable of processing the first cryptographic algorithm.

20. The computer device in accordance with claim 16, wherein the instructions further cause the at least one processor to determine the second cryptographic algorithm associated with the second signature, wherein the first cryptographic algorithm is different from the second cryptographic algorithm.

\*     \*     \*     \*     \*